US012393418B2

(12) United States Patent
Rangaswamy et al.

(10) Patent No.: US 12,393,418 B2
(45) Date of Patent: Aug. 19, 2025

(54) SYSTEM FOR RECONFIGURING A LEGACY APPLICATION CODE AND A METHOD THEREOF

(71) Applicant: Tech Mahindra Limited, Pune (IN)

(72) Inventors: Raman Natteri Rangaswamy, Chennai (IN); Ramanand Perianayagam, Chennai (IN); Saraswathy Venkatesh Subramaniam, Chennai (IN); Jnana Prakasha Venugopal Narendra Krovvidi, Chennai (IN); Gomathi Selvaraj, Chennai (IN)

(73) Assignee: Tech Mahindra Limited, Pune (IN)

( * ) Notice: Subject to any disclaimer, the term of this patent is extended or adjusted under 35 U.S.C. 154(b) by 40 days.

(21) Appl. No.: 18/379,266

(22) Filed: Oct. 12, 2023

(65) Prior Publication Data

US 2024/0303063 A1 Sep. 12, 2024

(51) Int. Cl.
*G06F 8/65* (2018.01)
*G06F 8/41* (2018.01)
*G06F 8/74* (2018.01)
*G06F 8/75* (2018.01)

(52) U.S. Cl.
CPC ............... *G06F 8/65* (2013.01); *G06F 8/427* (2013.01); *G06F 8/4435* (2013.01); *G06F 8/74* (2013.01); *G06F 8/75* (2013.01)

(58) Field of Classification Search
None
See application file for complete search history.

(56) References Cited

U.S. PATENT DOCUMENTS

| 8,819,621 | B2 | 8/2014 | Naik et al. |
| 10,970,067 | B1* | 4/2021 | Gupta .................... G06F 8/20 |
| 11,029,934 | B2* | 6/2021 | Weigert ................. H04L 63/30 |
| 11,042,369 | B1 | 6/2021 | Kimball et al. |
| 11,593,103 | B1* | 2/2023 | Chawda .............. G06F 11/3612 |
| 12,124,859 | B2* | 10/2024 | Gonzalez ............ G06F 9/44505 |
| 2005/0138603 | A1* | 6/2005 | Cha ......................... G06F 8/53 |
| | | | 717/120 |

FOREIGN PATENT DOCUMENTS

IN 202021043520 A 4/2022

* cited by examiner

*Primary Examiner* — Marina Lee
(74) *Attorney, Agent, or Firm* — Taft Stettinius & Hollister LLP

(57) ABSTRACT

A system and method for reconfiguring legacy application code. The method includes receiving legacy application code as input through a user interface, and parsing legacy application code through a processor. The processor is configured for scanning legacy application code through a scanner, extracting business logic rules from the legacy application code, analyzing the legacy application code through an analyzer using a legacy code meta model, simulating content of the legacy application code by executing reverse engineering for obtaining reverse engineered legacy code, decomposing and componentizing reverse engineered legacy code for identifying legacy components that are clustered according to domain for obtaining decomposed domain and generating micro service templates from the decomposed domains of the reverse engineered legacy code. The micro service templates are used for generating updated code framework for reconfiguring the legacy application code.

8 Claims, 25 Drawing Sheets

| ⌂ Dashboard / 🖵 CICS Validation Rules Report | | | | |
|---|---|---|---|---|

Application: [ACCOUNTS PAYABLE ▾]  Map Name: [ACRV880.bms]  [Submit]

Show [10 ▾] entries                                                              Search: [        ]

| PROGRAM_NAME ▲ | MAP_NAME ◆ | APPLICATION ◆ | FIELD_NAME ◆ | VALIDATION_RULE ◆ |
|---|---|---|---|---|
| AP540P00 | ACRV880 | ACCOUNTS PAYABLE | HOLDFLGE | IF HOLDFLGF = 'Y'<br>MOVE 1 TO MONTH-SUB1<br>END-IF |
| AP540P00 | ACRV880 | ACCOUNTS PAYABLE | STATUSO | IF STATUSO = 03<br>MOVE MARCH TO WS-PERIOD-MONTH<br>GO TO DATE-EXIT<br>END-IF |
| AP540P00 | ACRV880 | ACCOUNTS PAYABLE | HOLDFLGE | IF HOLDFLGF = 'N'<br>DISPLAY 'UNSUCCESSFUL SORT'<br>DIVIDE ZEE-ROW BY ZEE-ROW GIVING ZEE-ROW |

Figure 17

| ⌂ Dashboard / CICS X-Ref Report | | | | | | |
|---|---|---|---|---|---|---|

Application: [All ▾]  [Submit]

Search: [Min 3 characters]  [Search]  [Clear Search]  Total no of records: 21

| COMPONENT_NAME | COMPONENT_TYPE | CALLING_APP_NAME | CALLED_NAME | CALLED_TYPE | CALLED_APP_NAME | ACCESS_MODE |
|---|---|---|---|---|---|---|
| CICSPGM | COBOL_CICS | ACCOUNTS PAYABLE | FETCH | COBOL | UNKNOWN | |
| CICSPGM | COBOL_CICS | ACCOUNTS PAYABLE | MSTMAP1 | MAP | UNKNOWN | SEND |
| CICSPGM | COBOL_CICS | ACCOUNTS PAYABLE | TRN1 | TRAN | UNKNOWN | |
| CICSPGM | COBOL_CICS | ACCOUNTS PAYABLE | FETCH1 | COBOL | UNKNOWN | HANDLE |
| CICSPGM | COBOL_CICS | ACCOUNTS PAYABLE | VINKSUPD | COBOL | UNKNOWN | XCTL |
| CICSPGM | COBOL_CICS | ACCOUNTS PAYABLE | VINKSDEL | COBOL | UNKNOWN | XCTL |
| CICSPGM | COBOL_CICS | ACCOUNTS PAYABLE | VINKSWRI | COBOL | UNKNOWN | LINK |
| CICSPGM | COBOL_CICS | ACCOUNTS PAYABLE | OUTPUT | TSQ | UNKNOWN | READQ |
| CICSPGM | COBOL_CICS | ACCOUNTS PAYABLE | INPUT | TSQ | UNKNOWN | DELETEQ |
| CICSPGM | COBOL_CICS | ACCOUNTS PAYABLE | DATAQUEUE | TSQ | UNKNOWN | WRITEQ |

Figure 18

△ Dashboard / ⌗ CRUD Report

Application: [All ▼] [Submit]

Show [10 ▼] entries          Search: [        ]

| COMPONENT_NAME | COMPONENT_TYPE | CALLING_APP_NAME | TABLE | CRUD | SQL |
|---|---|---|---|---|---|
| AP540P00 | COBOL | ACCOUNTS PAYABLE | SCU1099 | CREATE | INSERT INTO SCU1099 (CTLENTYID, VCKVAL, COMPANY, VNDRSTCD, VNDRLONGNM, IRSVNDRNM, VNDRADDRLN002, VNDRCITYLN, VNDRZIPCD, RENTAMT, OTHERAMT, WTHLDAMT, NEMPLAMT, ATTYAMT, MEDICALAMT, PRINTIND, LASTPRINTDT, IRSTINTYPECD, IRSORVATREGREF) VALUES (:SCU10-CTLENTYID, :SCU10-VCKVAL, :SCU10-COMPANY, :SCU10-VNDRSTCD, :SCU10-VNDRLONGNM, :SCU10-IRSVNDRNM, :SCU10-VNDRADDRLN002, :SCU10-VNDRCITYLN, :SCU10-VNDRZIPCD, :SCU10-RENTAMT, :SCU10-OTHERAMT, :SCU10-WTHLDAMT, :SCU10-NEMPLAMT, :SCU10-ATTYAMT, :SCU10-MEDICALAMT, :SCU10-PRINTIND, :SCU10-LASTPRINTDT :SCU10-LASTPRINTDT-IND, :SCU10-IRSTINTYPECD, :SCU10-IRSORVATREGREF) |
| AP540P00 | COBOL | ACCOUNTS PAYABLE | SCC101 | UPDATE | UPDATE SCC101 SET DATACOL1 = :CC101-DATACOL1 WHERE KEYCOL = :CC101-KEYCOL |
|  |  |  |  |  | INSERT INTO SCU1099 (CTLENTYID VCKVAL COMPANY VNDRSTCD |

Figure 19

△ Dashboard / ⌗ Orphan/Driver Report

Application: [All ▼] [Submit]

Show [10 ▼] entries          Search: [        ]

| COMPONENT_NAME | COMPONENT_TYPE | APPLICATION |
|---|---|---|
| AP1099TG | COPYBOOK | ACCOUNTS PAYABLE |
| AP505D05 | COPYBOOK | ACCOUNTS PAYABLE |
| AP505D10 | COPYBOOK | ACCOUNTS PAYABLE |
| AP505D25 | COPYBOOK | ACCOUNTS PAYABLE |
| AP540C00 | PROC |  |
| AP540CL1 | SYSIN | ACCOUNTS PAYABLE |
| AP540TPD | COPYBOOK | ACCOUNTS PAYABLE |
| AP540TWS | COPYBOOK | ACCOUNTS PAYABLE |

Figure 20

| Dashboard / Drop Impact Report | | | |
|---|---|---|---|
| Application: All  Submit | | | |

Show 10 entries                                      Search:

| DROP_IMPACT_NAME | DROP_IMPACT_TYPE | APPLICATION | ORPHAN_COMPONENT_NAME |
|---|---|---|---|
| SC700PRM | COPYBOOK | DISTRICT PROCESSING | GL659P00.cbl |
| SC700LNK | COPYBOOK | DISTRICT PROCESSING | GL659P00.cbl |
| SC700M00 | COBOL | UNKNOWN | GL659P00.cbl |
| SC700ERR | COPYBOOK | UNKNOWN | GL659P00.cbl |
| CBLTDLI | COBOL | UNKNOWN | GL659P00.cbl |
| GL375EXT | COPYBOOK | UNKNOWN | GL375P00.cbl |
| GL375MSK | COPYBOOK | UNKNOWN | GL375P00.cbl |
| GLCTLCD | COPYBOOK | GENERAL LEDGER | GL375P00.cbl |

Figure 21

| Dashboard / Dead Report | | | | | |
|---|---|---|---|---|---|
| Application: All  Submit | | | | | |

Show 10 entries                                      Search:

| COMPONENT_NAME | COMPONENT_TYPE | APPLICATION | DEAD_PARA_LIST | DEAD_PARA_COUNT | NO_OF_DEAD_LINES |
|---|---|---|---|---|---|
| AP540P00.cbl | COBOL | ACCOUNTS PAYABLE | 410000-DATE-RTN-X,511000-DUE-DATE-AUDIT,511110-GEN-ERRORS-X,511120-ABEND-RTN-X,530000-BALANCE-REPORT-X,531000-GENERATE-AP540R25-X,532000-GENERATE-AP540R26-X | 7 | 60 |
| AP549P00.cbl | COBOL | ACCOUNTS PAYABLE | 410000-DATE-RTN-X,530000-BALANCE-REPORT-X,531000-GENERATE-AP549R05-X,531100-GENERATE-AP549R05-X,531110-GENERATE-AP549R05-X,532000-GENERATE-AP549R10-X,532100-GENERATE-AP549R10-X,533000-GENERATE-AP549R15-X | 8 | 19 |
|  |  |  | EOJ,EXIT-100-A,EXIT-PRINT,500-OPEN-10-PRINTERS,500-OPEN-9-PRINTERS,500-OPEN-8-PRINTERS,500-OPEN-7-PRINTERS,500-OPEN-6-PRINTERS,500-OPEN-5-PRINTERS,500-OPEN-A |  |  |

USER [Microservice] saved
Service API

| Commands | |
|---|---|
| userDAO.java: insert: insert into users (firstname, lastname, email, country, password) values(?,?,?,?,?)"; | ○POST○GET○PUT○DELETE |
| userAccountDAO.java: deleteapartment: DELETE FROM apartment WHERE id = ?"; | ○POST○GET○PUT○DELETE |
| userAccountDAO.java: deletehouse: DELETE FROM house WHERE id = ?"; | ○POST○GET○PUT○DELETE |
| userAccountDAO.java: deleteIdealHome: DELETE FROM idealhome WHERE sid = ?"; | ○POST○GET○PUT○DELETE |
| user.java: setEmail: | ○POST○GET○PUT○DELETE |
| user.java: setPassword: | ○POST○GET○PUT○DELETE |
| user.java:getEmail: | ○POST○GET○PUT○DELETE |
| user.java: getPassword: | ○POST○GET○PUT○DELETE |

[Next]

Figure 34(c)

SYSTEM FOR RECONFIGURING A LEGACY APPLICATION CODE AND A METHOD THEREOF

CROSS-REFERENCE TO RELATED APPLICATIONS AND PRIORITY

The present application claims priority to Indian Patent Application No. 202221058824 filed on 14 Oct. 2022 the entirety of which is hereby incorporated by reference.

TECHNICAL FIELD

The present disclosure, in general, relates to a field of legacy code decomposition and reengineering. More particularly, the present disclosure relates to a system and method for reconfiguring a legacy application code.

BACKGROUND

Legacy application or software often refers to a software that was originally written years or even decades ago and that remains in production today. The application generally includes outdated and/or inefficient programming languages and techniques compared to modern systems. Legacy applications are expensive to maintain, difficult to modify or modernize and hence legacy application or software become inefficient compared to modern software and may not be compatible with modern devices or meet desired software architecture goals.

Even if it is no longer used, a legacy system may continue to impact the organization due to historical role. Historic data may not have been converted into the new system format and may exist within the new system with the use of a customized schema crosswalk, or may exist only in a data warehouse. In either case, the effect on business intelligence and operational reporting may be significant. The legacy system may include procedures or terminology which are no longer relevant in the current context, and may hinder or confuse understanding of the methods or technologies used and thus reconfiguring or modernizing such legacy codes or system becomes important.

Generally, maintaining and upgrading the existing legacy software is feasible compared to building a new software from scratch, as legacy software is often built on a giant code base. Rewriting the giant code from the scratch may be extremely tedious and complex. It may be cheaper and easier to update a code base than to create a new one. Manual optimization and refactoring of legacy software may be an expensive process because of the large code base and may require expertise of original authors of the legacy code which is difficult. Additionally, any enterprise/organization conducting a legacy application migration is bound to select a new platform for efficiency, speed, stability and more dynamic capabilities.

Further, traditional processes and system reconfiguring the legacy application code may use a combination of disparate tools which mainly focus on the reverse engineering aspect of legacy modernization or straight syntax-based code conversion and hence the legacy application modernization process may not adequate. Furthermore, some algorithms in legacy code are inefficient as they were designed to address specific scenarios. So far available solutions have not provided an adequate process for legacy application modernization.

SUMMARY

Before the present method and system for reconfiguring a legacy application code is described, it is to be understood that this application is not limited to the particular system, and methodologies described, as there can be multiple possible embodiments that are not expressly illustrated in the present disclosure. It is also to be understood that the terminology used in the description is to describe the particular versions or embodiments only, and is not intended to limit the scope of the present application. This summary is not intended to identify essential features of the claimed subject matter nor is it intended for use in determining or limiting the scope of the claimed subject matter.

In one implementation, a method for reconfiguring a legacy application code is described. The method comprises receiving legacy application code as an input through a user interface (UI), parsing legacy application code through a processor and the processor is coupled to a memory and the processor is configured to execute instructions stored in the memory. The processor is further configured for scanning the legacy application code through a scanner, wherein the legacy application code is written in a source language, extracting business logic rules from the legacy application code, wherein the business logic rules is extracted through natural language processing, analyzing the legacy application code, through an analyzer by using a legacy code meta model, wherein the legacy code meta model is used for extracting key features from the legacy application code and signatures of one or more legacy languages used for writing the legacy application code, wherein the key features and the signatures are used for reconfiguring the legacy application code, simulating content of the legacy application code based on the analyzing by executing reverse engineering for obtaining a reverse engineered legacy code, decomposing and componentizing, the reverse engineered legacy code for identifying legacy components, wherein the legacy components are clustered according to domain for obtaining a decomposed domain and generating micro service templates from the decomposed domains of the reverse engineered legacy code, wherein the micro service templates are used for generating an updated code framework for reconfiguring the legacy application code.

In another implementation, a system for reconfiguring the legacy application code is described. The system comprises of the UI, the memory and the processor. The processor is coupled to the memory and the processor is configured to execute instructions stored in the memory. The processor is further configured for scanning the legacy application code through the scanner, wherein the legacy application code is written in the source language, extracting the business logic rules from the legacy application code, wherein the business logic rules are extracted through natural language processing, analyzing the legacy application code through the analyzer by using the legacy code meta model, wherein the legacy code meta model is used for extracting key features from the legacy application code and signatures of one or more legacy languages used for writing the legacy application code, wherein the key features and the signatures are used for reconfiguring the legacy application code, simulating content of the legacy application code based on the analyzing by executing reverse engineering for obtaining the reverse engineered legacy code. The processor is further configured for decomposing and componentizing the reverse engineered legacy code for identifying legacy components, wherein the legacy components are clustered according to domain for obtaining the decomposed domain and generating micro service templates from the decomposed domains of the reverse engineered legacy code, wherein the micro service templates are used for generating the updated code framework for reconfiguring the legacy application code.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to refer like features and components.

FIG. 4 (b) illustrates another exemplary block diagram of the reverse engineering process executed by the system (102), in accordance with an embodiment of the present subject matter;

FIG. 17 illustrates file validation extraction from legacy application code performed by the system (102), in accordance with an embodiment of the present subject matter;

FIG. 18 illustrates CICS cross reference report extraction performed by the system (102), in accordance with an embodiment of the present subject matter;

FIG. 19 illustrates CRUD extraction from legacy application code performed by the system (102), in accordance with an embodiment of the present subject matter;

FIG. 20 illustrates orphan driver reports extraction from legacy application code performed by the system (102), in accordance with an embodiment of the present subject matter;

FIG. 21 illustrates drop impact analysis of the legacy application code performed by the system (102), in accordance with an embodiment of the present subject matter;

FIG. 22 illustrates dead para report analysis from legacy application code performed by the system (102), in accordance with an embodiment of the present subject matter;

FIG. 32 illustrates diagram showing domain decomposition reports, in accordance with an embodiment of the present subject matter;

DETAILED DESCRIPTION

Figure 1:
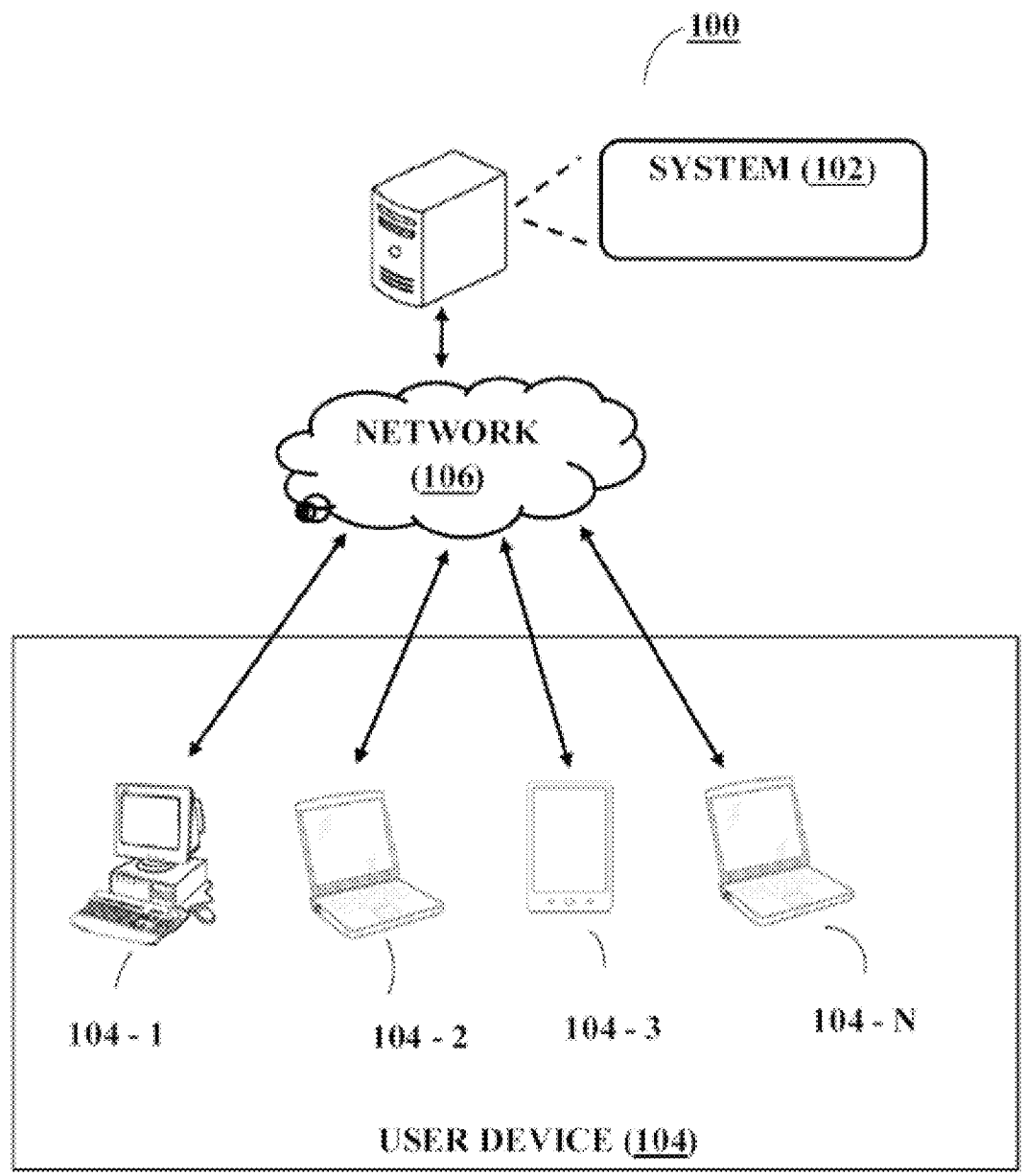
FIG. 1 illustrates a network implementation (100) of a system (102) for reconfiguring a legacy application code, in accordance with an embodiment of the present subject matter.

Some embodiments of the present disclosure, illustrating all its features, will now be discussed in detail. The words "comprising", "receiving", "determining", "assigning" and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a", "an" and "the" include plural references unless the context clearly dictates otherwise. Although any systems and methods similar or equivalent to those described herein can be used in the practice or testing of embodiments of the present disclosure, the exemplary, systems and methods for reconfiguring a legacy application code are now described. The disclosed embodiments of the systems and methods for reconfiguring a legacy application code are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure for reconfiguring a legacy application code is not intended to be limited to the embodiments illustrated but is to be accorded the widest scope consistent with the principles and features described herein.

Traditional processes and system for reconfiguring a legacy application code may use a combination of disparate tools which mainly focus on the reverse engineering aspect of legacy modernization or straight syntax-based code conversion and hence the legacy application modernization process may not adequate.

The present subject matter overcomes the problems of the existing system and method through the proposed system and method for reconfiguring a legacy application code.

Referring now to the drawings, and more particularly to FIGS. 1 through 34(c), where similar reference characters denote corresponding features consistently throughout the figures, there are shown embodiments.

Referring now to FIG. 1, a network implementation of a system 102 for reconfiguring a legacy application code is disclosed. In one example, the system 102 may be connected with user devices 104-1 through 104-N (collectively referred as 104) through a communication network 106.

It should be understood that the system 102 and the user devices 104 correspond to computing devices. It may be understood that the system 102 may also be implemented in a variety of computing systems, such as a laptop computer, a desktop computer, a notebook, a workstation, a mainframe computer, a server, a network server, a cloud-based computing environment, or a smart phone and the like. It may be understood that the mobile devices 104 may correspond to a variety of a variety of portable computing devices, such as a laptop computer, a desktop computer, a notebook, a smart phone, a tablet, a phablet, and the like.

In one implementation, the communication network 106 may be a wireless network, a wired network, or a combination thereof. The communication network 106 can be implemented as one of the different types of networks, such as intranet, Local Area Network (LAN), Wireless Personal Area Network (WPAN), Wireless Local Area Network (WLAN), wide area network (WAN), the internet, and the like. The communication network 106 may either be a dedicated network or a shared network. The shared network represents an association of the different types of networks that use a variety of protocols, for example), Hypertext Transfer Protocol (HTTP), Transmission Control Protocol/Internet Protocol (TCP/IP), and the like, to communicate with one another. Further, the communication network 106 may include a variety of network devices, including routers, bridges, servers, computing devices, storage devices, and the like.

Figure 2:
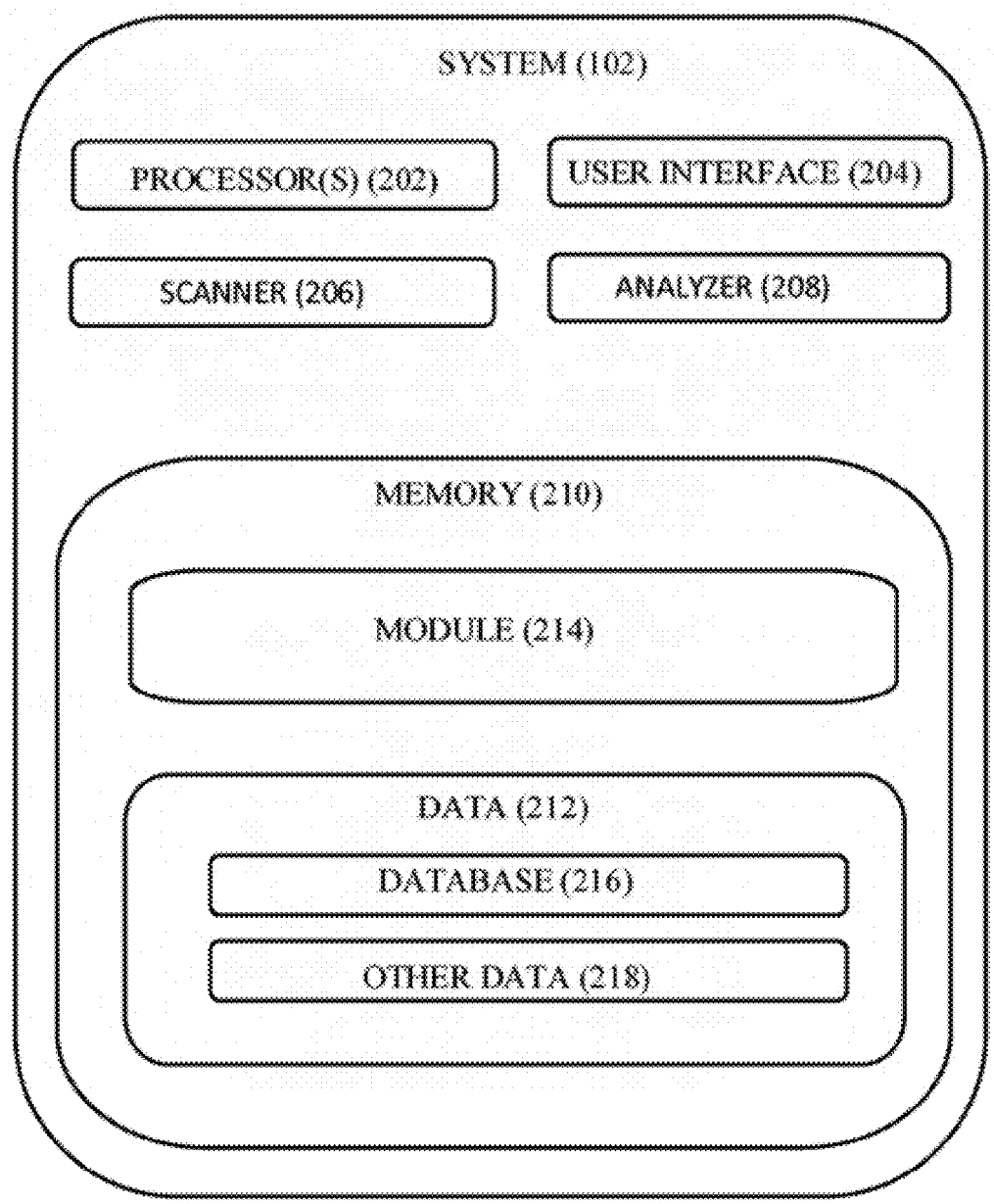
FIG. 2 illustrates a block diagram of the system (102) for reconfiguring the legacy application code, in accordance with an embodiment of the present subject matter.

Referring now to FIG. 2, a block diagram 200 of the system 102 is illustrated in accordance with an embodiment of the present subject matter. In one embodiment, the system 102 may include at least one processor 202, a user interface 204 (may also as referred to input/output (I/O) interface), scanner 206, analyzer 208 and a memory 210. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 210.

The user interface 204 may include a variety of software and hardware interfaces, for example, a web interface, a graphical user interface, a command line interface, and the like. The user interface 204 may allow a user to interact with the system 102. Further, the user interface 204 may enable the system 102 to communicate with the user devices 104, and other computing devices, such as web servers and external data servers (not shown). The user interface 204 can facilitate multiple communications within a wide variety of networks and protocol types, including wired networks, for example, LAN, cable, etc., and wireless networks, such as WLAN, cellular, or satellite. The user interface 204 may include one or more ports for connecting a number of devices to one another or to another server.

The memory 210, amongst other things, serves as a repository for storing data processed, received, and generated by one or more of modules 214. The memory 210 may include any computer-readable medium or computer program product known in the art including, for example, volatile memory, such as Static Random Access Memory (SRAM) and Dynamic Random Access Memory (DRAM), and/or non-volatile memory, such as Read Only Memory (ROM), Erasable Programmable ROM (EPROM), Electrically Erasable and Programmable ROM (EEPROM), flash memories, hard disks, optical disks, and magnetic tapes.

The memory 210 may include data generated as a result of the execution of one or more of the modules 214. The modules 214 may comprise plurality of modules. The plurality of modules may comprise a receiving module, a scanning module, an analyzing module, a decomposition module, a reconfiguration module. The plurality of modules may be configured to execute set of instructions and are not shown in FIG. 2.

The receiving module may be configured to receive query input from a user through the user Interface 204 by the processor 202. The scanning module may be configured for scanning the legacy application code. The analyzing module may be configured to analyze configuration details of the legacy application code in order to perform reverse engineering over the legacy application code. The decomposition module may be configured to decompose reverse engineered legacy code for identifying legacy components. The reconfiguration module may be configured to reconfigure the legacy application code. The reconfiguration further modernises the legacy application code.

The data 212 may include a database 216 for storing data processed, computed, received, and generated by one or more of the modules 214. Furthermore, the data 212 may include other data 218 for storing data generated as a result of the execution of modules than the ones mentioned above.

In an embodiment, the system 102 is configured to reconfigure the legacy application code. The system 102 comprises the user interface 204, the memory 210 and the processor 202 coupled to the memory 210, the scanner 206 and the analyzer 208.

In an embodiment, the system 102 is configured to receive a legacy application code as an input file (or simply file) for reconfiguring the legacy application code. The legacy application code is further fed to the scanner 206 for scanning of the legacy application code. The legacy application code may be written in any source language. In an exemplary embodiment, the legacy code may include and not limited to COBOL, CICS, JCL, Natural\ADABAS, IMS DB, DB2, Assembler, APS COBOL, MFS, Micro Focus COBOL, shell scripts, PL/SQL, AS400 RPG, COB400, VB.NET, C#, VB6, VBA, Java or Cold Fusion.

The processor 202 then extract a business logic rules from the legacy application code. The business logic rules may be extracted through natural language processing (NLP). The business logic rules are used for representing the legacy application code in an informative manner for example, details on version of legacy application code, programming language, API's used etc. The business logic rules illustrates legacy program name, relevant para name in the legacy application code, source statements in the legacy application code, rule description, rule category or rule relation associated with legacy application code. Further, the business logic rules translate the legacy application code in one of a chart, flow diagram, or annotated version of the legacy application code.

The legacy application code is then analyzed through the analyzer 208 by generating a legacy code meta model. The analyzer 208 may include and not limited to a set of expandable modules. The set of expandable modules are configured by using algorithms or logic for extracting the key features and the signatures of the legacy application code. The set of expandable modules may include and not limited to inventory, cyclomatic complexity, dead code, cross reference, CRUD, BRE extractor, CICS screen simulator, spider analysis or program flow.

In an embodiment, the legacy code meta model is used for extracting key features from the legacy application code and signatures of one or more legacy languages used for writing the legacy application code. The key features and the signatures are used for reconfiguring the legacy application code. Based on the analyzing, content of the legacy application code is simulated by executing reverse engineering for obtaining a reverse engineered legacy code. The content of the legacy application code may include but not limited to components of the legacy application code, total number of lines in the legacy application code, number of tables in the legacy application code, orphan or drive components, missing components, and lines of dead code in the legacy application code. Parts of the legacy application code are simulated during the reverse engineering which is generally inaccessible to business and other stakeholders.

In an embodiment, the reverse engineered legacy code is then decomposed and componentized to identify legacy components. The legacy components are clustered according to domain for obtaining a decomposed domain. The legacy components are decomposed on criteria like technology layer components in the legacy application code, affinity-based domain components in the legacy code. The system 102 applies clustering and community detection in directed networks to identify potential groups of classes with semantic affinity associated with the legacy application code.

In another embodiment, deployable micro service templates are generated and scaffolded from the decomposed domains or layers of the reverse engineered legacy code. The micro service templates are used for generating an updated code framework for reconfiguring the legacy application code for forward engineering the legacy application code to the target architecture. The decomposition and componentization are performed by applying algorithms on the reverse engineered legacy code for decomposing the legacy components, based on criteria. The criteria may include and not limited to technology layer components in the legacy application code, affinity-based domain components in the legacy application code, Batch MF components in the legacy application code, online MF Components in the legacy application code.

The legacy components are then optimized for finding an optimal level of decomposition granularity for decomposing the legacy application code based on predefined criteria. The predefined criteria may include and not limited to a of max percentage domain Cohesive Index (CI) to total CI, a max % of dependency indicating dependency between components decomposed in the legacy application code for conversion of the components to the micro services, a Standard Deviation (SD) of domain CI excluding zero domains, SD of connectivity excluding zero values or % of zero domains. Optimization of legacy components here refers to automatically finding an optimal level of decomposition granularity based on a proprietary factors like max percentage domain Cohesive Index (CI) to total CI, a max % of dependency, a Standard Deviation (SD) of domain CI excluding zero domains, SD of connectivity excluding zero values or % of zero domains.

Optimization of legacy components refers to automatically finding an optimal level of decomposition granularity based on proprietary factors associated with the legacy application code. Optimization of decomposition enables the optimal size, cohesiveness and loose coupling of decomposed components given the constraints imposed by the existing legacy code. The domain is decomposed by using decomposition algorithms for identifying domain affinity strength parameter required for decomposition of the domain and the decomposed domain comprises domain name, file name or class, cohesive index. The decomposition algorithm is derived by progressively iterating through a range of legacy code derived domains affinity strength parameters as input parameters and the strength parameters are calculated for each input parameter value metrics that objectively measure factors like relative size of the decomposed components, relative dependency between decomposed components, variation in decomposed components size, variation of decomposed component dependencies, and relative number of minor decomposed components. The decomposition algorithm finds the domain affinity strength parameter that optimizes the measures resulting in a decomposition that follows good micro service decomposed design.

The legacy code meta model as described above is generated by using a pattern analysis algorithm and library.

The legacy code meta model adds additional attributes used by the analyzer for analyzing the legacy application code. The additional attributes may include and not limited to type of component in the legacy application code, language agnostic directed graph representation of relationship and weights between the type of components, called & calling app name in the legacy application code and glossary and annotations associated with the legacy application code.

Figure 3:
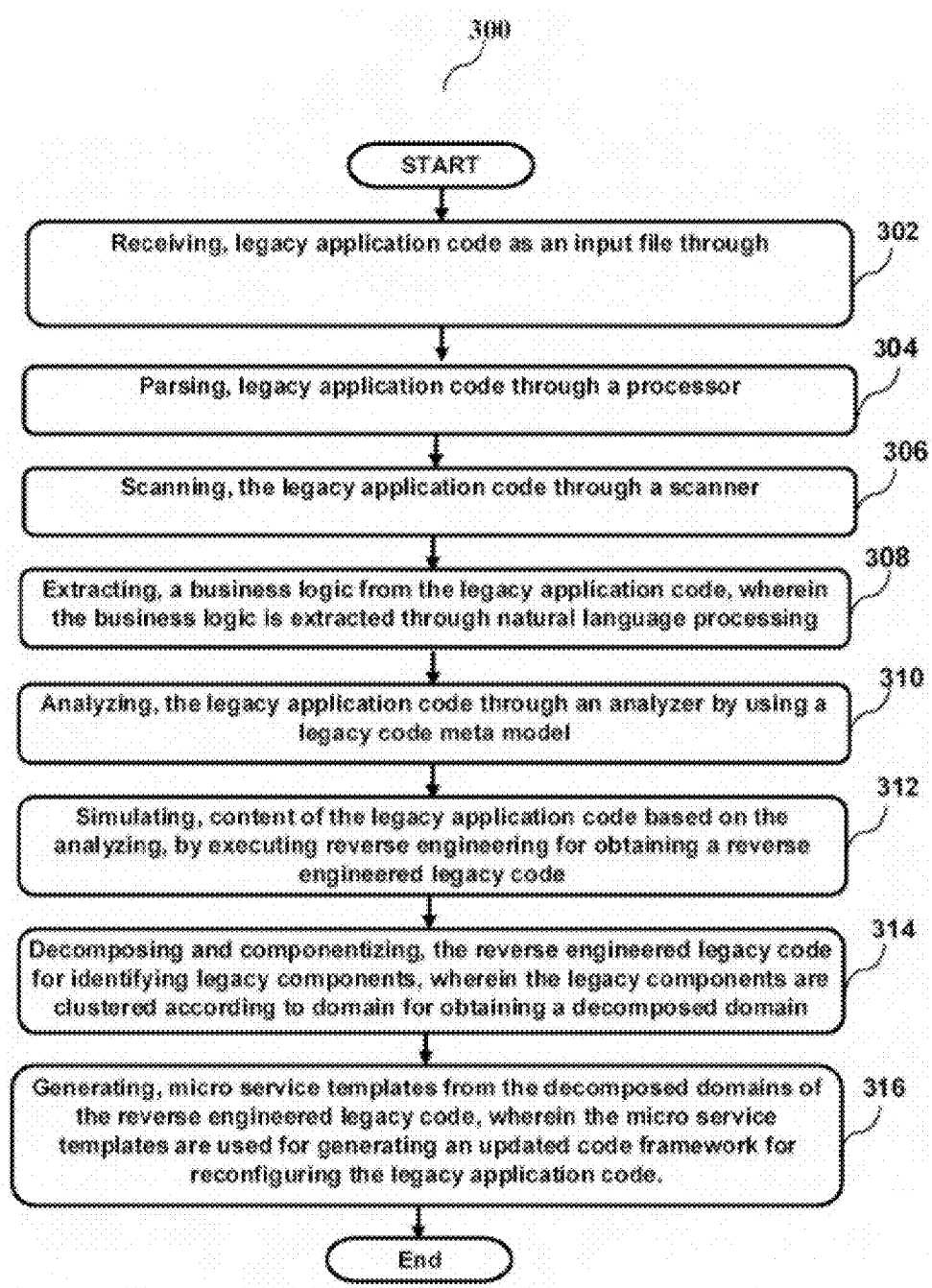
FIG. 3 illustrates a flow diagram of a method (300) for reconfiguring a legacy application code, in accordance with an embodiment of the present subject matter.

Referring now to FIG. 3, the method 300 for reconfiguring the legacy application code through the system 102 is described. Description of the method 300 is similar to the system 102 and hence are not repeated for the sake of brevity.

As part of the method 300, at step 302, the method 300 provides receiving the legacy application code as the input file (or simply file).

At step 304, the method 300 includes parsing the parsing the legacy application code through the processor 202. The processor 202 is coupled to the memory 210, and the processor 202 is configured to execute instructions stored in the memory 210.

At step 306, the method 300 includes scanning of the legacy application code through the scanner 206 and the legacy application code is written in the source language.

At step 308, the method 300 includes extracting the business logic rules from the legacy application code. The business logic rules are extracted through natural language processing.

At step 310, the method 300 includes analysing the legacy application code through the analyser 208 by generating the legacy code meta model.

At step 312, the method 300 includes simulating content of the legacy application code based on the analysing by executing reverse engineering for obtaining a reverse engineered legacy code.

At step 314, the method 300 includes decomposing and componentizing the reverse engineered legacy code for identifying legacy components. The legacy components are clustered according to domain for obtaining a decomposed domain. The legacy components can be decomposed based on technology layers, batch, online At step 316, the method 300 includes generating micro service templates from the decomposed domains of the reverse engineered legacy code. The micro service templates are used for generating the updated code framework for reconfiguring the legacy application code.

The order in which the method 300 is described is not intended to be construed as a limitation, and any number of the described method blocks can be combined in any order to implement the method 300 or alternate methods. Additionally, individual blocks may be deleted from the method 300 without departing from the scope of the subject matter described herein.

Figure 4A:
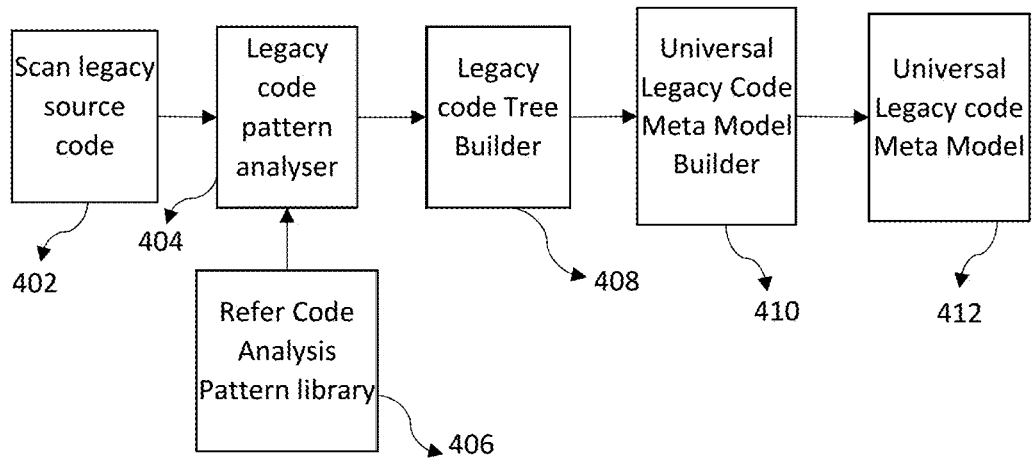
FIG. 4 (a) illustrates an exemplary block diagram detailing reverse engineering process executed by the system (102), in accordance with an embodiment of the present subject matter.
Figure 4B:
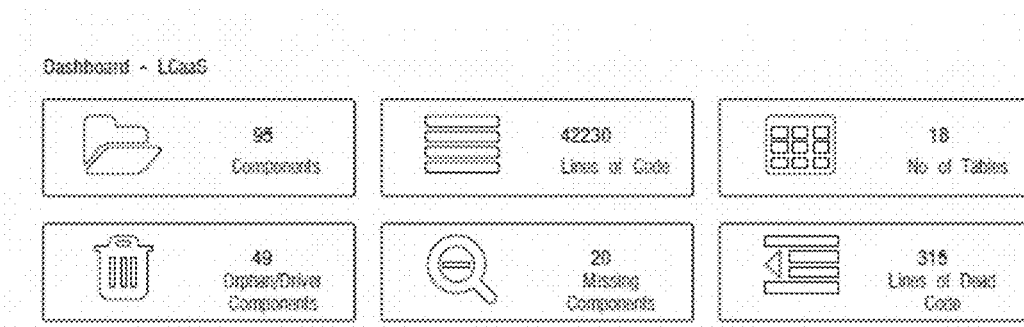

Referring now to FIG. 4 (*a*), the reverse engineering process executed through the system 102 is shown. In an exemplary embodiment, as shown in FIG. 4 (*a*), at step 402, the legacy application code is scanned and then provided to the analyzer 208 at step 404. At step 406, the legacy application code pattern is analyzed by referring code analysis pattern library. Then legacy code tree builder is generated at step 408 and provided the legacy code to a universal legacy meta model builder 410 to generate a universal legacy code meta model at step 412. The legacy code meta model is a legacy language agnostic representation of most legacy language and an extendable model which can add additional attributes as and when required for the analyzer 208. The universal legacy metamodel enables a uniform way to analyze and decompose legacy applications. The legacy code meta model is generated by proprietary legacy code pattern analysis algorithms and library to extract key features and signatures of various legacy languages and constructs.

Referring now to FIG. 4 (*b*), another exemplary block diagram of the reverse engineering process executed by the system (102) is described. In an exemplary embodiment, a dash board of reverse engineering process is shown. The dash board displays count for components, line of codes, number of tables, orphan/driver component, missing components, lines of dead codes.

Figure 5A:
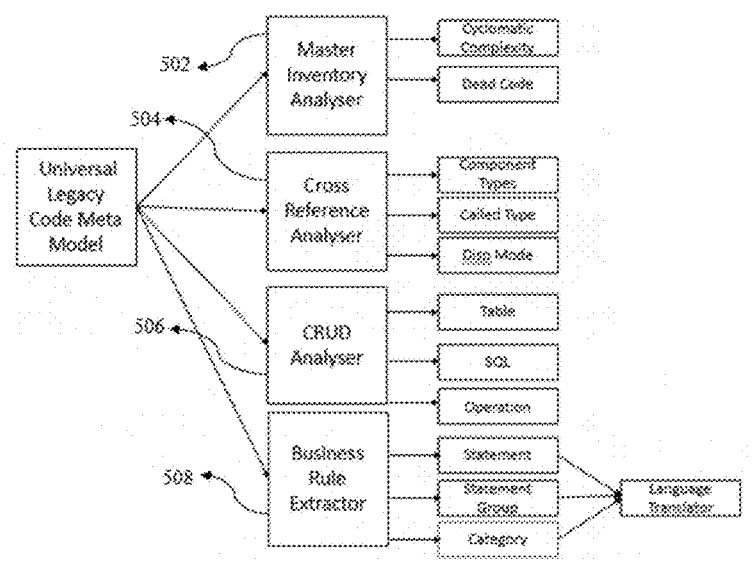
FIG. 5 (b) and FIG. 5 (b) illustrates an exemplary block diagram of analyzer process executed by the system (102), in accordance with an embodiment of the present subject matter.
Figure 5B:
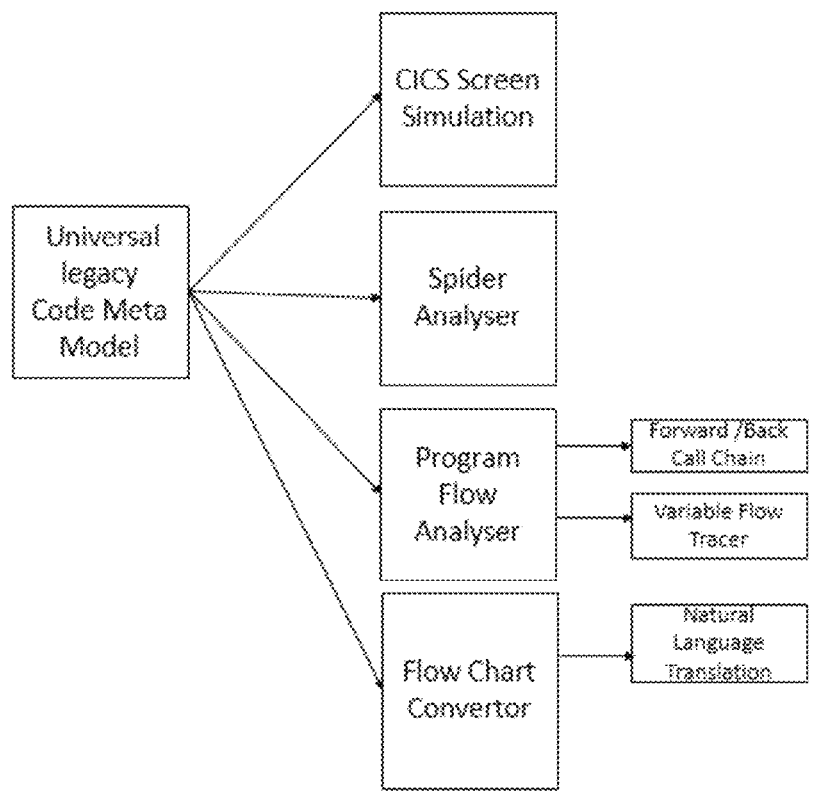

Referring now to FIG. 5 (*a*) and FIG. 5 (*b*) in combination, exemplary flow diagram of the analyzer process is described. As shown in FIG. 5(*a*), the analyzer process has an expandable set of analyzers. The expandable set of analyzers configured in the universal legacy code meta model here comprise master inventory analyzer 502, cross reference analyzer 504, CRUD analyzer 506, business rule extractor 508. The expandable set of analyzers use inputs from the universal legacy Code meta model. The analyzers are a set of expandable modules that have algorithms that extract various aspects of legacy code analysis as depicted in the exemplary block diagram as shown in FIG. 5 (*a*) and FIG. 5 (*b*). The legacy code analysis may include and not limited to include inventory, cyclomatic complexity, dead code, cross reference, CRUD, BRE extractor, CICS Screen simulator, spider analysis, program Flow, flow chart converter.

Figure 6:
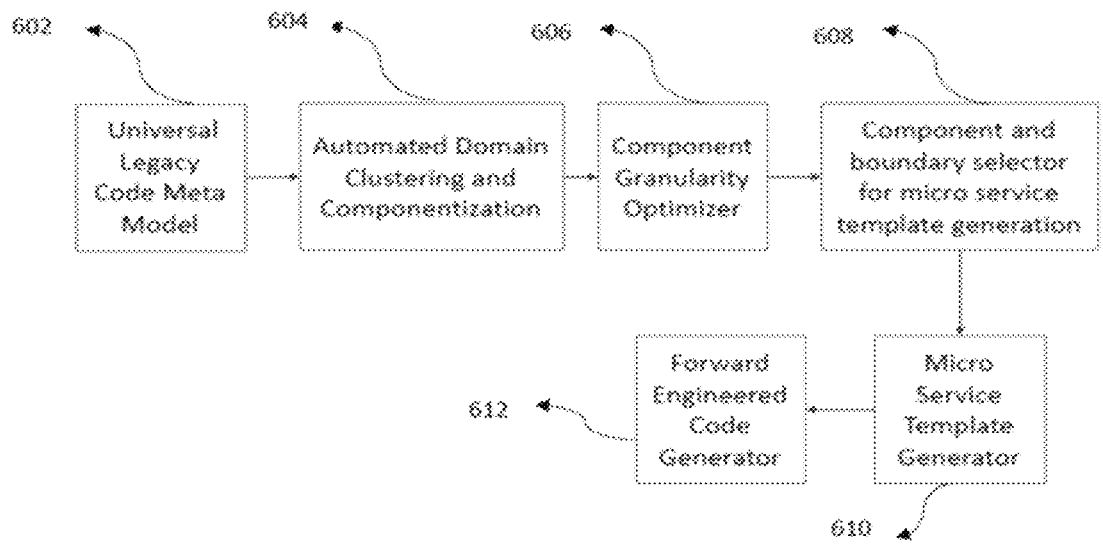
FIG. 6 illustrates an exemplary block diagram of decomposition and reverse engineering process executed by the system (102), in accordance with an embodiment of the present subject matter.

In an exemplary embodiment, as shown in FIG. 6, the decomposition and reverse engineering process is described. The decomposition and reverse engineering process applies algorithms to identify the legacy components such as classes or files which have affinity and cluster the identified legacy components into decomposition boundaries. This process is described in the exemplary block diagram as shown in FIG. 6. At step 602, an automated domain clustering and componentization unit use inputs from the universal legacy code meta model. The inputs are the reverse engineered legacy code. Optimization algorithms and rules are applied to find the optimal level of decomposition granularity based on the multiple of proprietary and unique criteria like % of max domain CI to total CI, max % of dependency, deviation of domain CI excluding zero domains, deviation of connectivity excluding zero values and % of zero domains. The users are also provided with an option to vary the levels of decomposition granularity. Once the decomposition is done based on the level of granularity at step 604, the component and boundary selector allow users to select and fine tune the decomposed components that are to be exposed as micro services at step 606. The micro services template generator automatically analyses the underlying legacy code to identify service signatures and generates the service template at step 608. The forward engineering code generator then uses the service template to generate modernized framework code for deployment at step 610.

Figure 7:
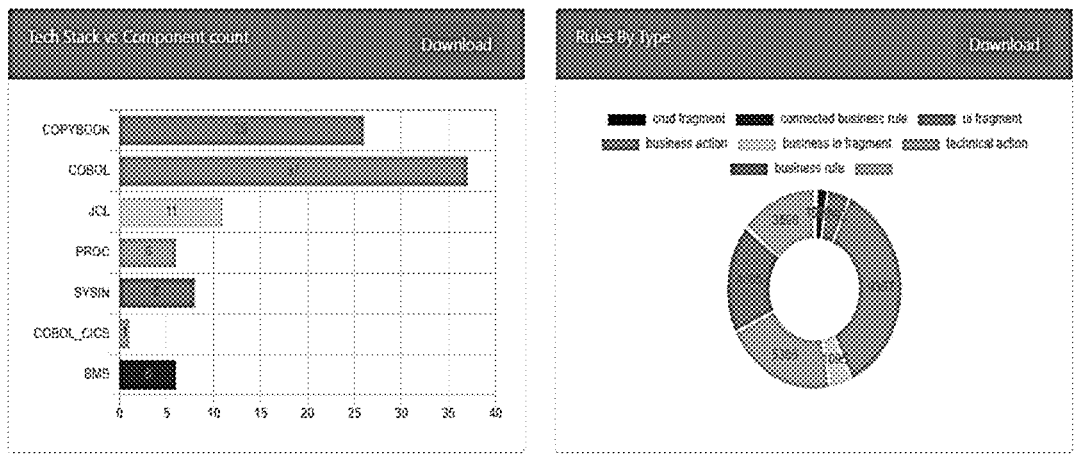
FIG. 7 illustrates an exemplary plot showing rule type analysis of the legacy application code performed by the system (102), in accordance with an embodiment of the present subject matter.

Now referring to FIG. 7, an exemplary plot showing rule type analysis of the legacy application code is described. Tech stack versus component count is shown showing count for each of COPYBOOK, COBOL, JCL, PROC, SYSIN, COBOL_CICS, AND BMS. The rule type may include and not limited to crud fragment, connected business rule, UI fragment, business action, business io fragment, technical action, business rule.

Figure 8:
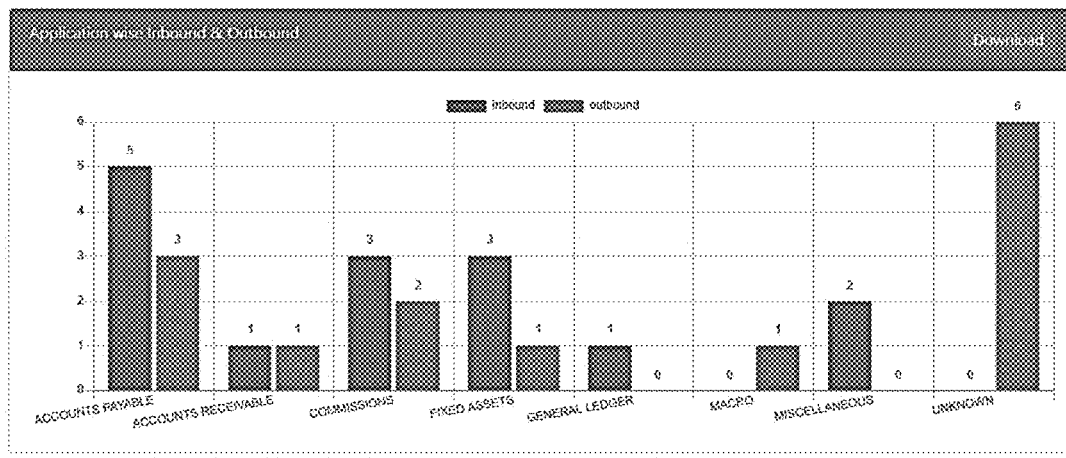
FIG. 8 illustrates an exemplary plot showing inbound/OutBound analysis of the legacy application code performed by the system (102), in accordance with an embodiment of the present subject matter.

Now referring to FIG. 8, a plot illustrating an application wise inbound/OutBound analysis of the legacy application code is shown. In an example, the application wise analysis is shown for each of accounts payable, accounts receivable, commissions, fixed assets, general ledger, macro, miscellaneous, and unknown.

Figure 9:
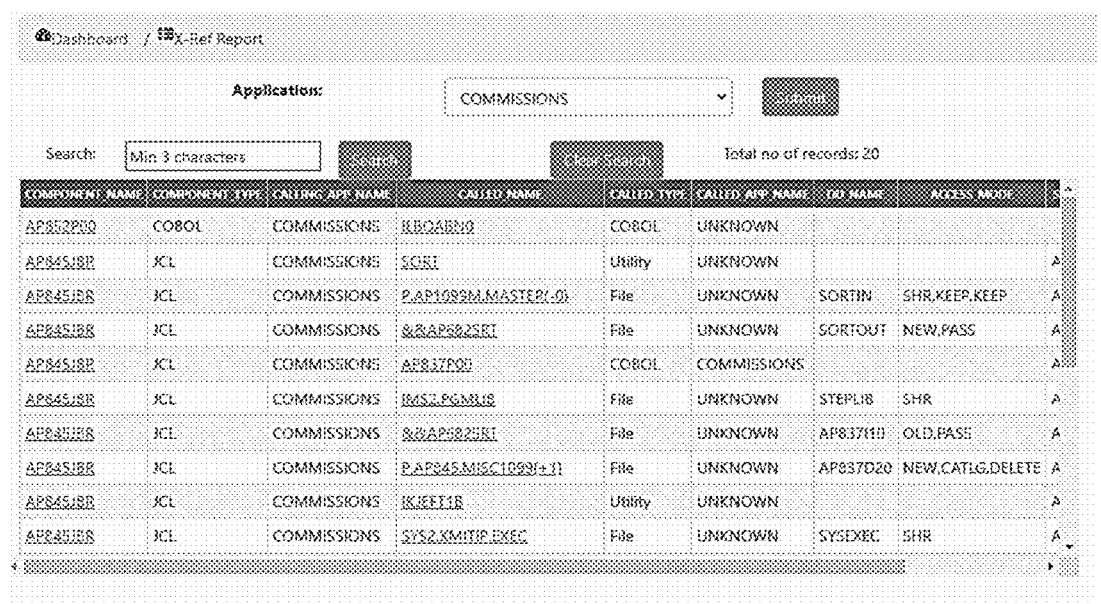
FIG. 9 illustrates a cross reference analysis of the legacy application code performed by the system (102), in accordance with an embodiment of the present subject matter.

Now referring to FIG. 9, the cross-reference analysis of the legacy application code. As shown, the component type may include and not limited to COBOL or JCL. The cross-reference analysis provides analysis of each of component name, component type, calling app name, called name, called type, called app name, DD name, access mode etc.

Figure 10:
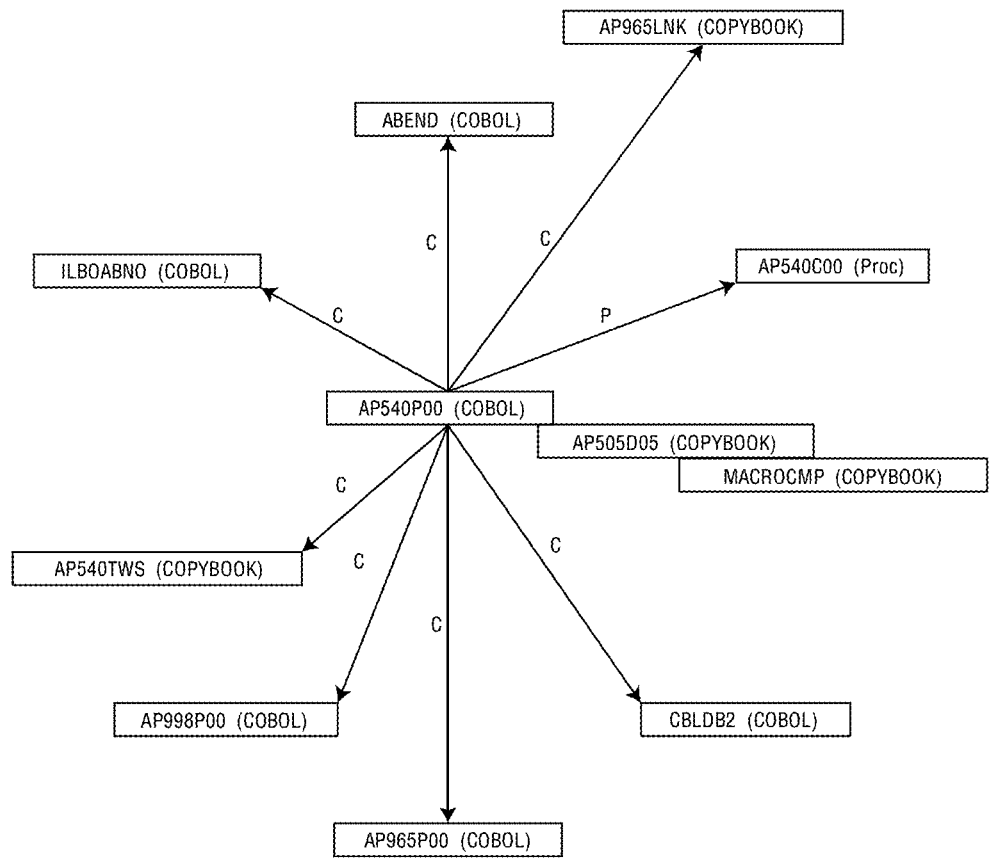
FIG. 10 illustrates an exemplary plot showing Spyder analysis of the legacy application code performed by the system (102), in accordance with an embodiment of the present subject matter.

Now referring to FIG. 10, a plot illustrating the spyder analysis of the legacy application code is shown. As shown, the component type is COBOL.

Figure 11:
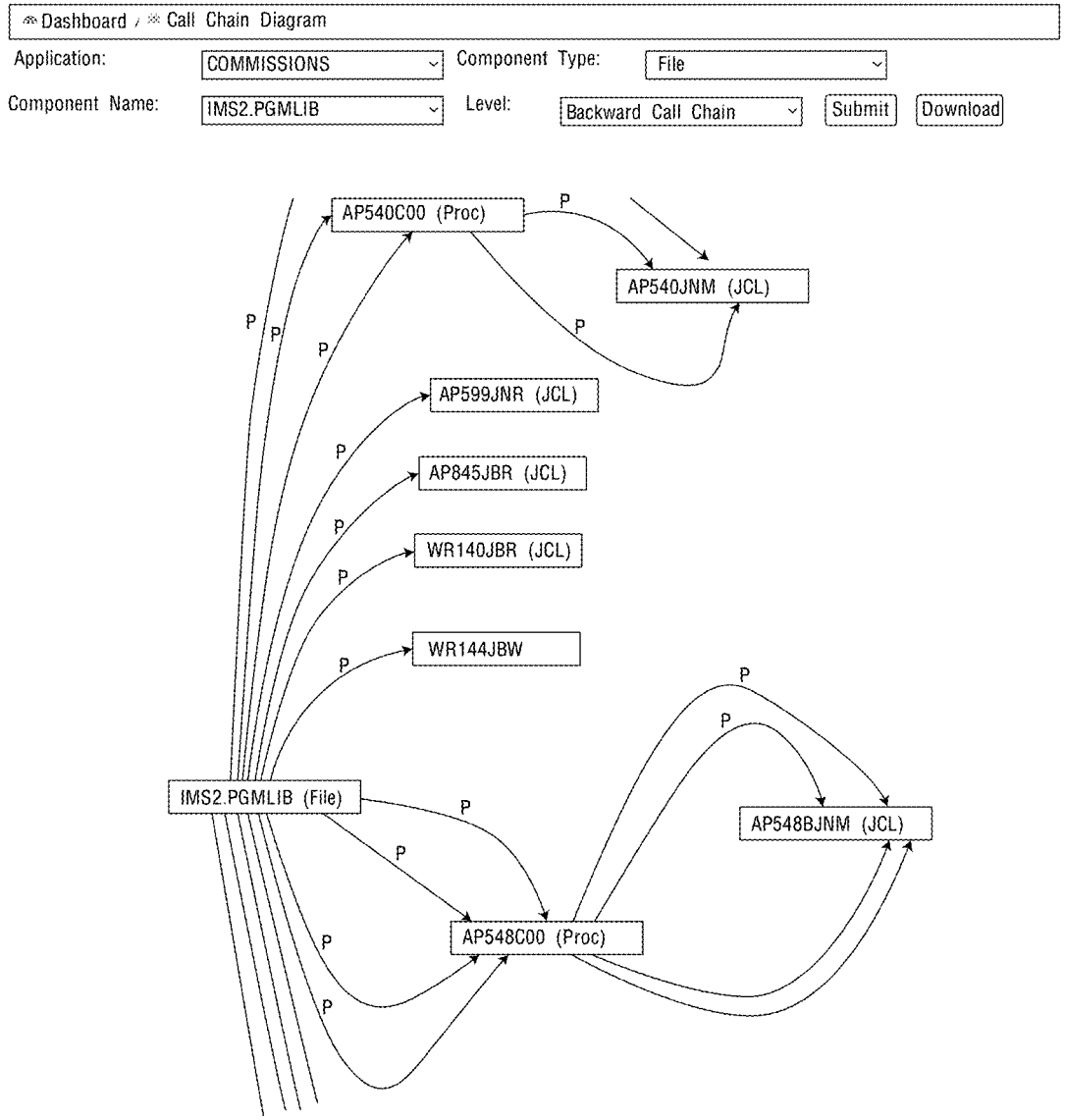
FIG. 11 illustrates an exemplary plot showing backward call chain analysis of the legacy application code performed by the system (102), in accordance with an embodiment of the present subject matter.

FIG. 11 shows an exemplary plot showing backward call chain analysis of the legacy application code. As shown, the component type shown here is "file".

Figure 12:
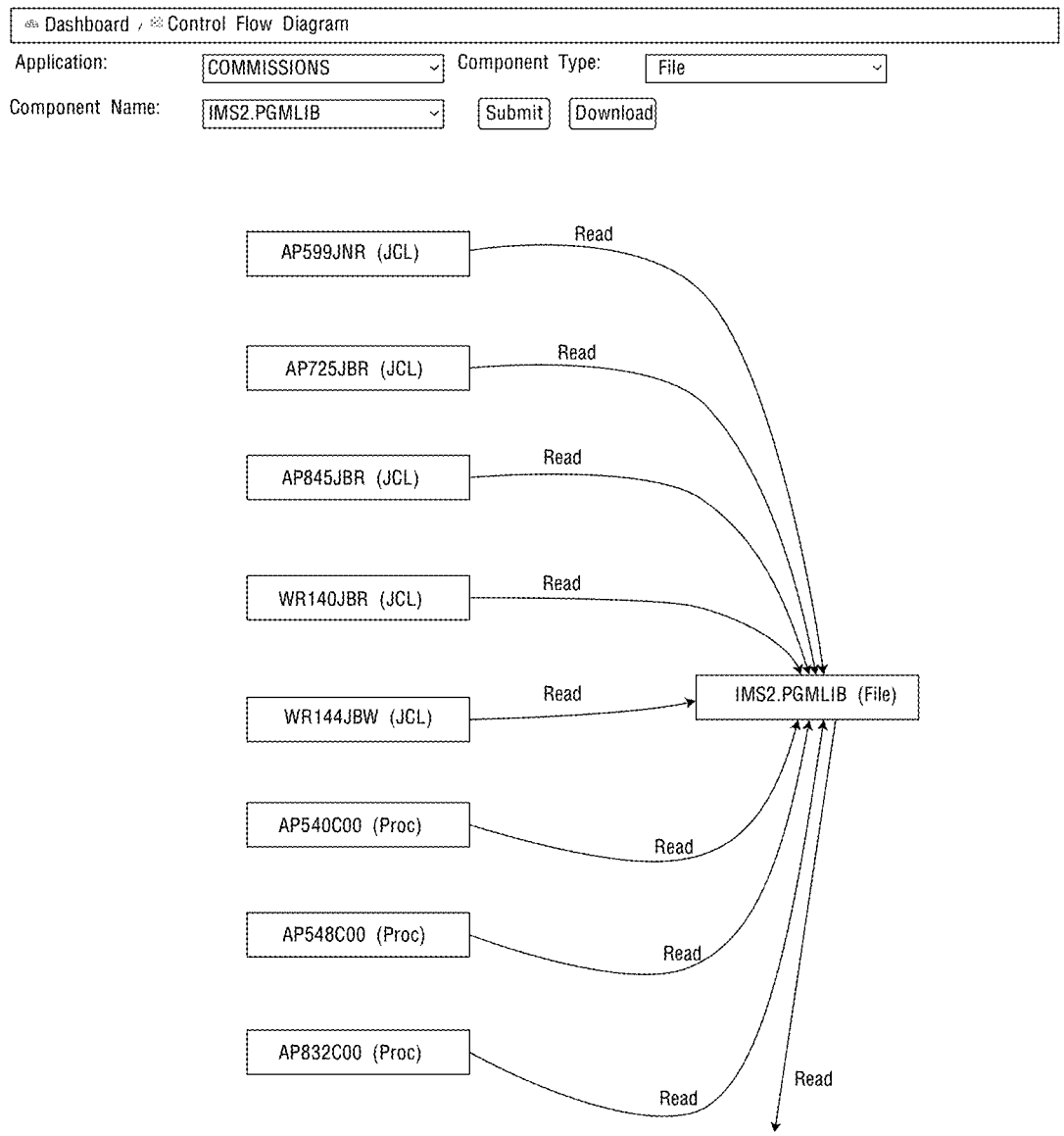
FIG. 12 illustrates an exemplary plot showing control flow analysis of the legacy application code performed by the system (102), in accordance with an embodiment of the present subject matter.
Figures 13, 14:
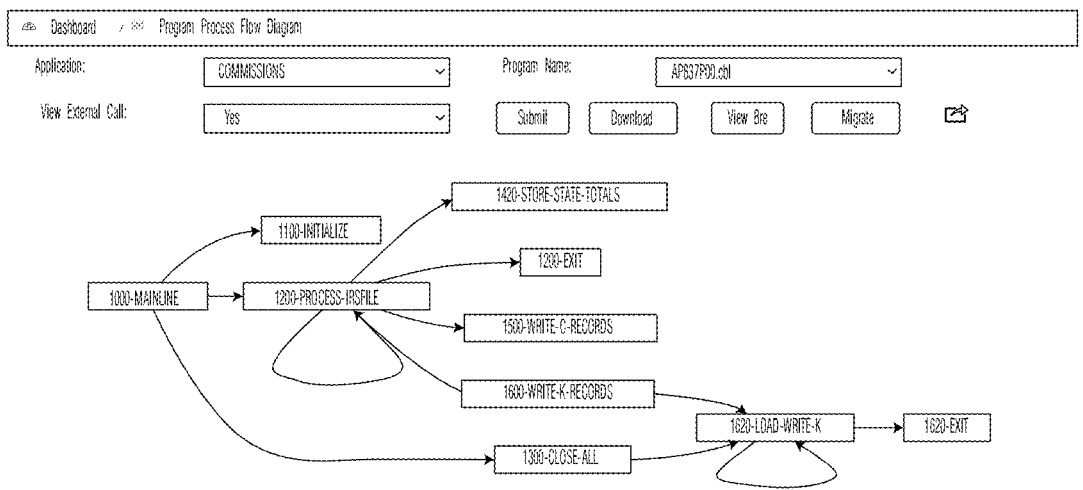
FIG. 13 illustrates legacy program process flow analysis performed by the system (102), in accordance with an embodiment of the present subject matter.
FIG. 14 illustrates an exemplary plot showing rule extraction of legacy application code in business-friendly representation, in accordance with an embodiment of the present subject matter.

FIG. 12 illustrates an exemplary plot showing control flow analysis of the legacy application code. As shown, the component type is "file" here. FIG. 13 further illustrates an exemplary process flow analysis of legacy program.

FIG. 14 illustrates an exemplary plot showing rule extraction for the legacy application code in the business-friendly representation. The system 102 automatically extracts and identifies business relatable rule categories from the legacy application code and shows the rule description (application business rules) as well. The rule description comprises Program name, para name, source statements, rule description, rule category, rule and rule relation. In an example, the business relatable rule may include conditionally routing documents, auto-populating fields in form, applying customer discounts assigning company assets, performing calculations etc.

Figures 15, 16:
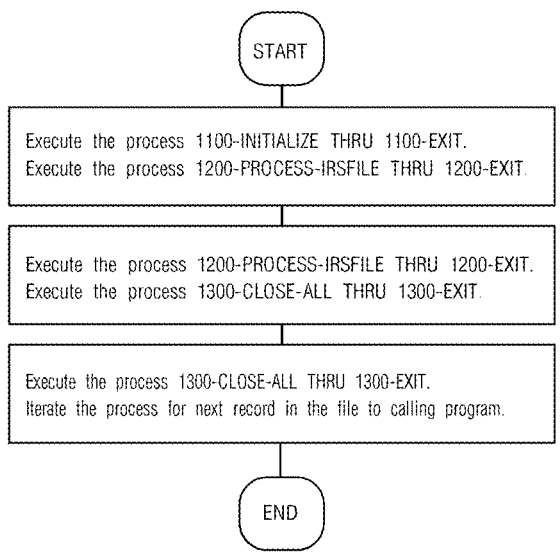
FIG. 15 illustrates an exemplary flow chart showing business friendly automated translated representation of the legacy application code performed by the system (102), in accordance with an embodiment of the present subject matter.
FIG. 16 illustrates screen simulation from legacy application code performed by the system (102), in accordance with an embodiment of the present subject matter.

FIG. 15 shows an exemplary flow chart showing business friendly automated translated representation of the legacy application code. The system 102 automatically drills down the legacy application code into a particular rule for detailed natural understandable language and converts into the flow chart as shown in FIG. 15 which is easy to understand to the user.

FIG. 16 shows screen simulation for the legacy application code. FIG. 17 shows file validation extraction from the legacy application code. The system 102 shows validation rules with field name and program name. FIG. 18 shows CICS cross reference report extraction. As shown, the component type is COBOL_CICS.

FIG. 19 shows CRUD extraction from legacy application code. As shown, the component type is COBOL. FIG. 20 shows orphan driver reports extraction from legacy application code. As shown, the component type and component name are displayed to the users for the application accounts payable.

FIG. 21 shows drop impact analysis of legacy application code. FIG. 22 shows dead para report analysis for the legacy application code. The system 102 automatically shows dead para list along with number of lines and para with dead codes. In FIG. 22, the dead or missing information is marked as unknown.

Figure 23:
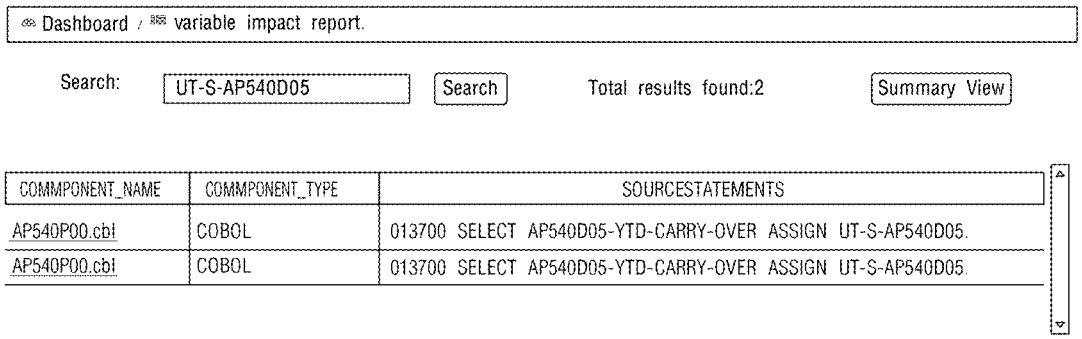
FIG. 23 illustrates variable impact analysis of the legacy application code performed by the system (102), in accordance with an embodiment of the present subject matter.
Figure 24:
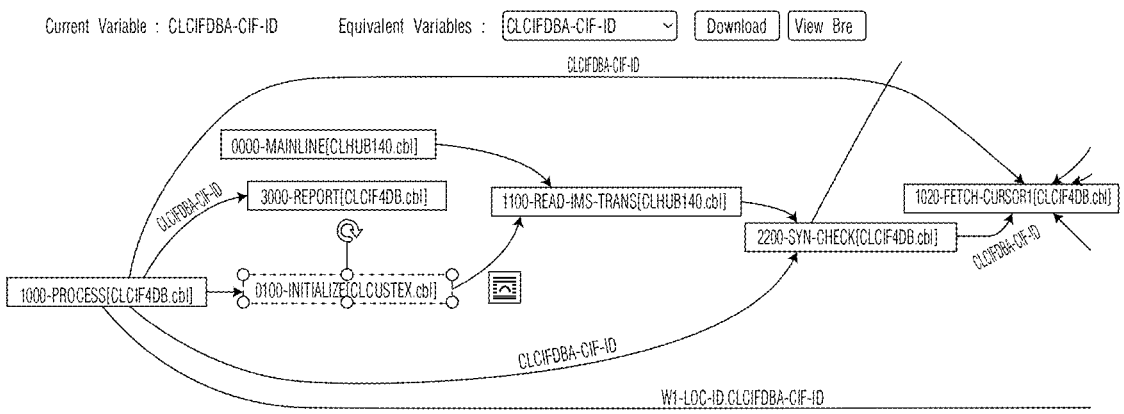
FIG. 24 illustrates variable trace analysis of legacy application code performed by the system (102), in accordance with an embodiment of the present subject matter.
Figure 25:
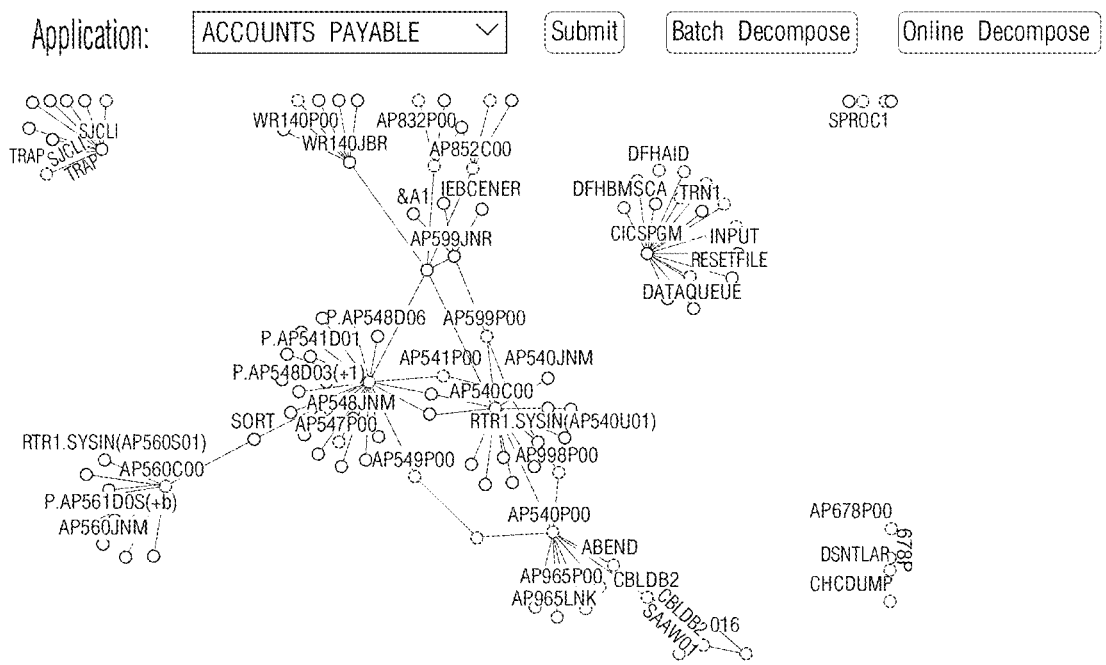
FIG. 25 illustrates an exemplary plot showing legacy Cobol decomposition performed by the system (102), in accordance with an embodiment of the present subject matter.

FIG. 23 shows variable impact analysis of the legacy application code. The system 102 automatically shows component type along with source statement. FIG. 24 shows variable trace analysis of legacy application code. FIG. 25 shows an exemplary plot showing legacy Cobol decomposition.

Figure 26:
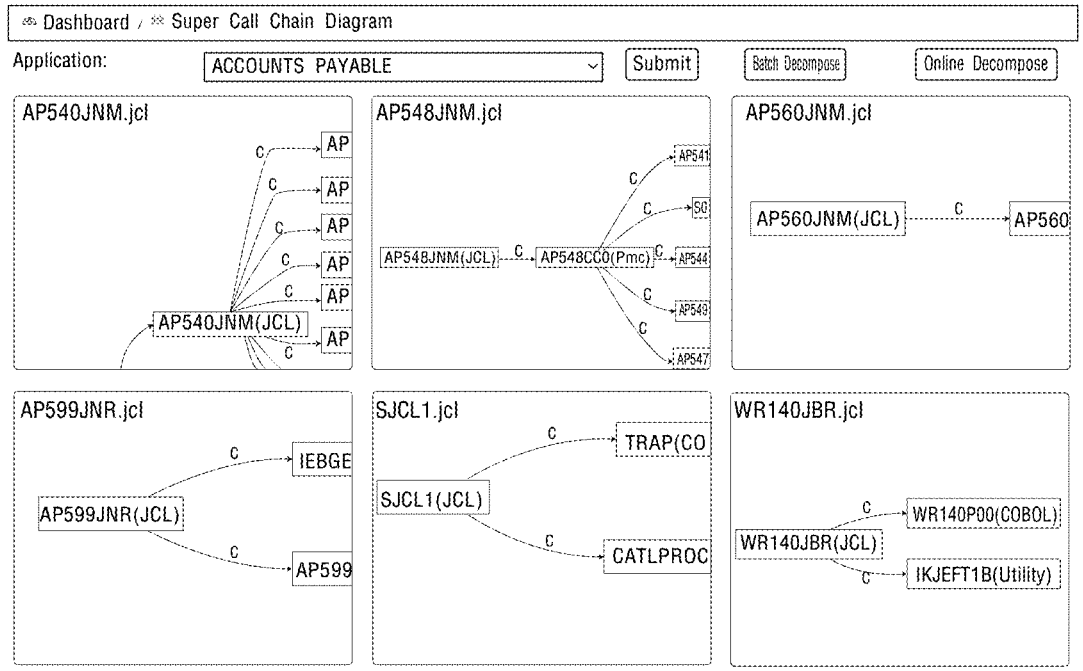
FIG. 26 illustrates exemplary diagram showing legacy cobol batch decomposition performed by the system (102), in accordance with an embodiment of the present subject matter.

FIG. 26 shows an exemplary diagram showing legacy cobol batch decompose.

Figure 27:
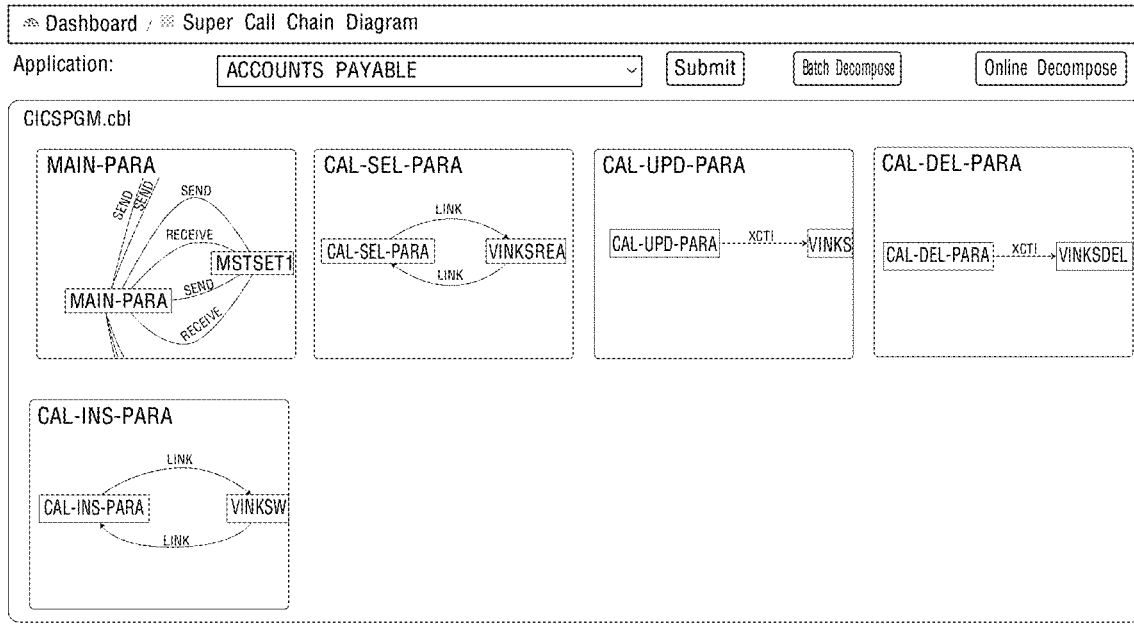
FIG. 27 illustrates an exemplary diagram showing legacy cobol online decomposition performed by the system (102), in accordance with an embodiment of the present subject matter.
Figure 28:
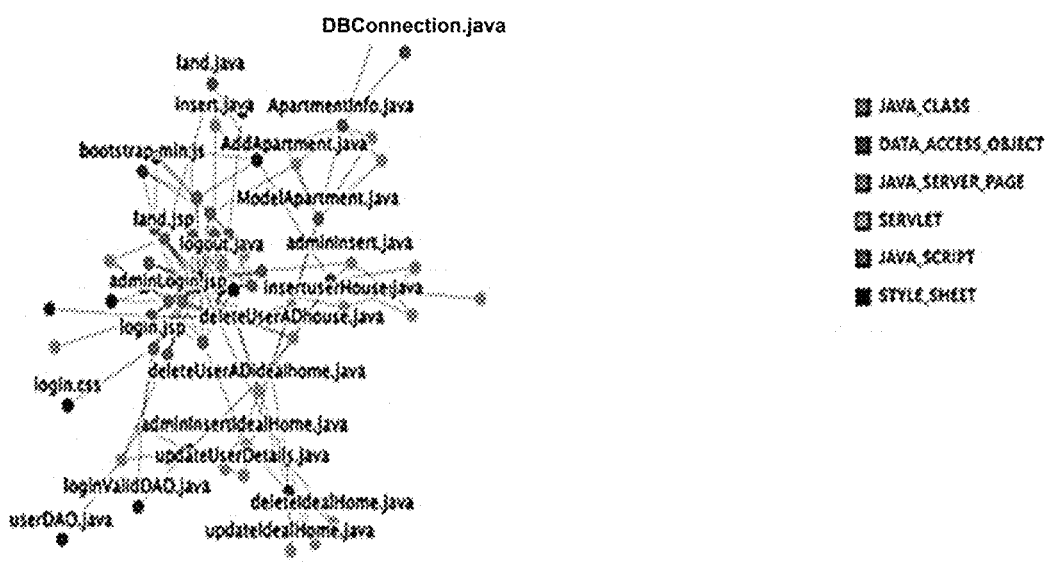
FIG. 28 illustrates an exemplary plot showing decomposer automated component type identification, in accordance with an embodiment of the present subject matter.

FIG. 27 shows an exemplary diagram showing legacy cobol online decompose. FIG. 28 shows an exemplary plot showing decomposer automated component type identification.

Figure 29:
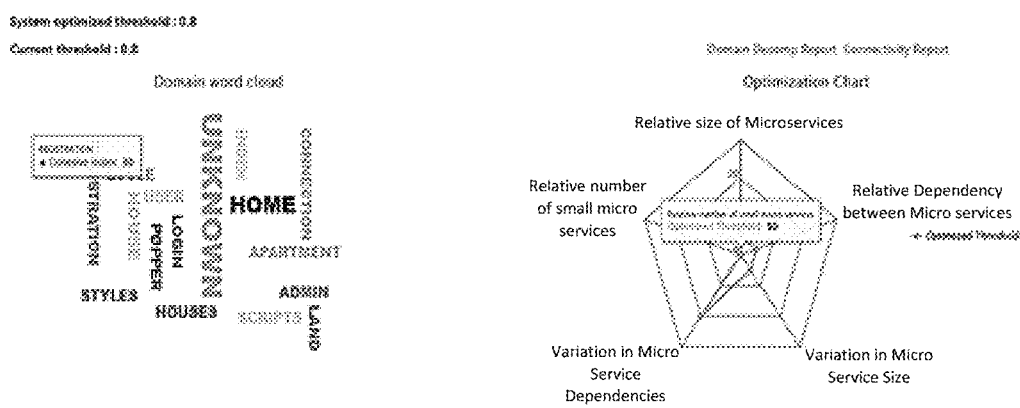
FIG. 29 illustrates an exemplary plot showing decomposition automated optimisation performed by the system (102), in accordance with an embodiment of the present subject matter.

FIG. 29 shows an exemplary plot showing decomposition automated optimisation. The micro service templates are generated and used for generating an updated code framework for reconfiguring forward engineering the legacy application code to the target architecture.

Figure 30:
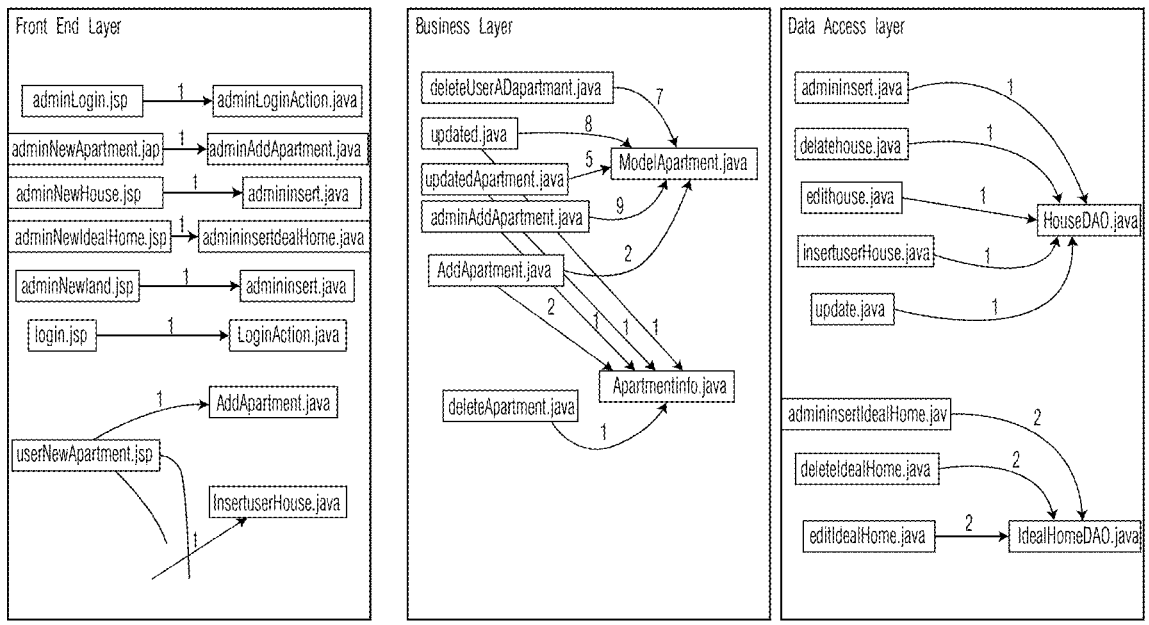
FIG. 30 illustrates diagram showing automated decomposition along tech layers performed by the system (102), in accordance with an embodiment of the present subject matter.

FIG. 30 shows automated decomposition along tech layers. The layer may include and not limited to front end layer, business layer, data access layer. The micro service templates are generated and scaffolded from the decomposed domains or layers of the reverse engineered legacy code.

Figure 31:
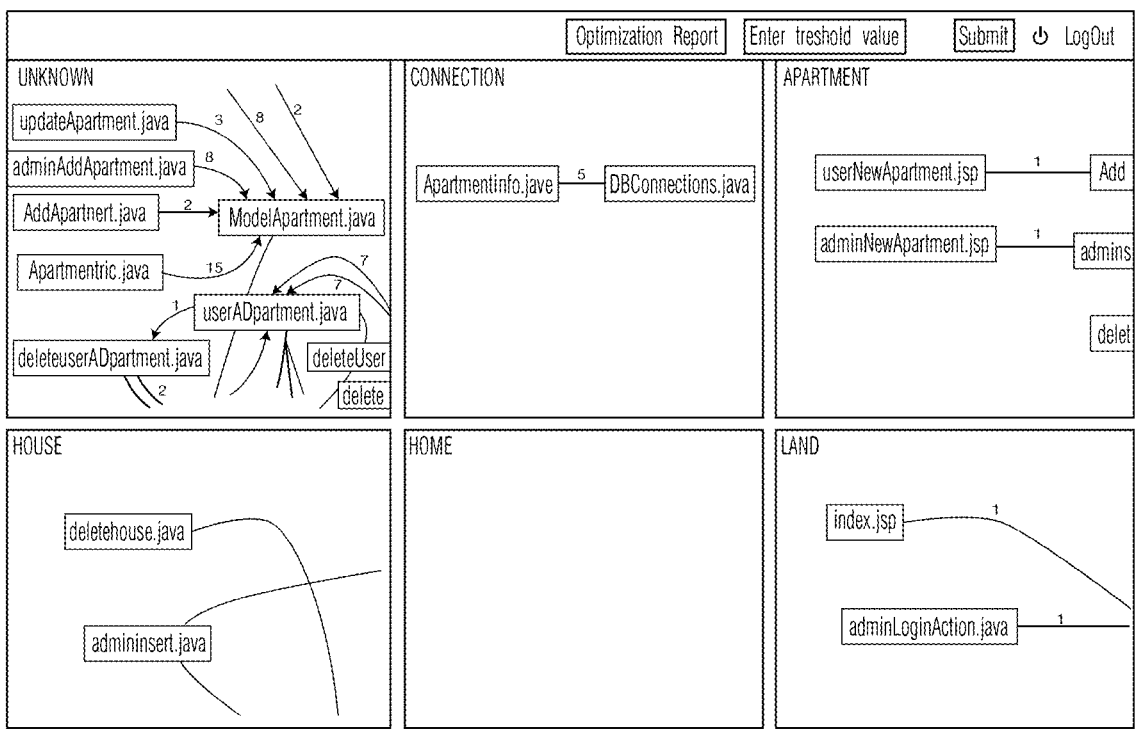
FIG. 31 illustrates diagram showing auto resolution and identification of domains by various granularities, in accordance with an embodiment of the present subject matter.
Figures 32, 33A:
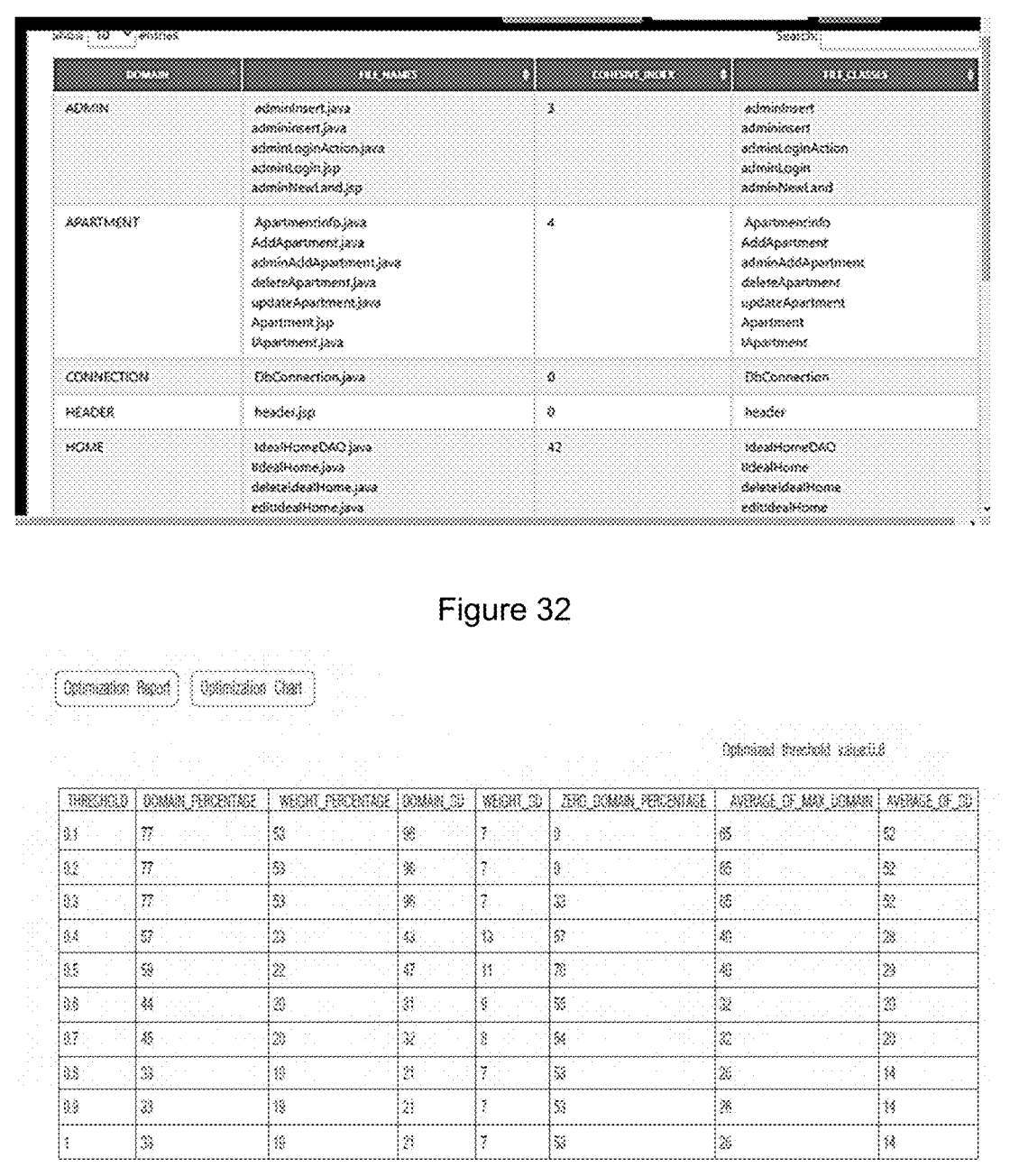
Figure 33B:
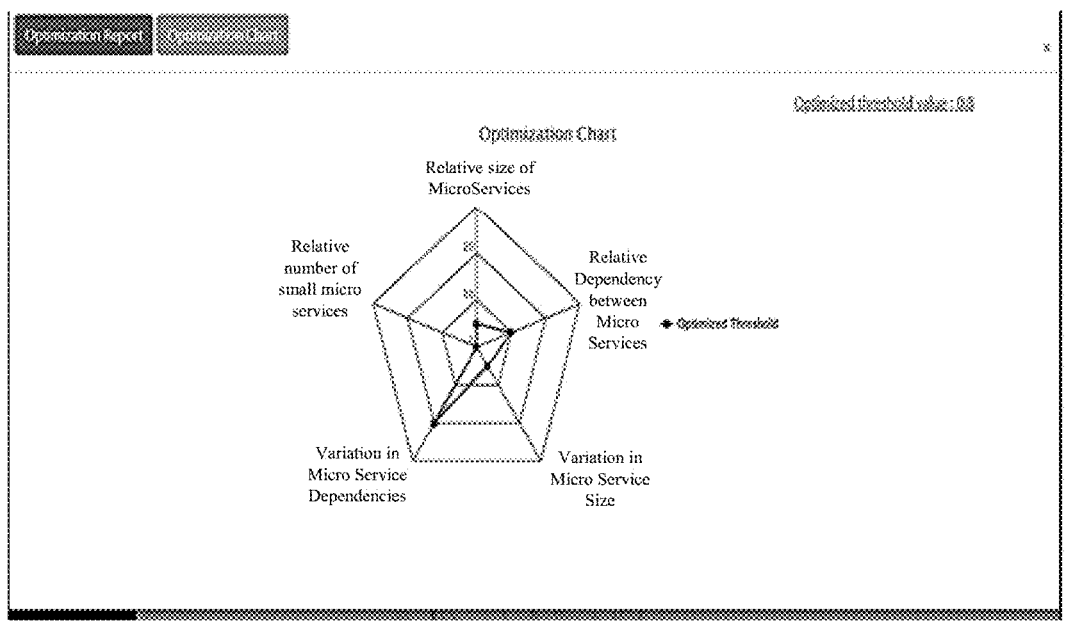
FIGS. 33 (a) and 33 (b) illustrates diagram showing domain decomposition optimization algorithm used by the system (102), in accordance with an embodiment of the present subject matter.

FIG. 31 shows auto resolution and identification of domains by various granularities. FIG. 32 shows domain decomposition reports. FIGS. 33 (a) and 33 (b) shows domain decomposition optimization algorithm and optimization chart.

Figure 34A:
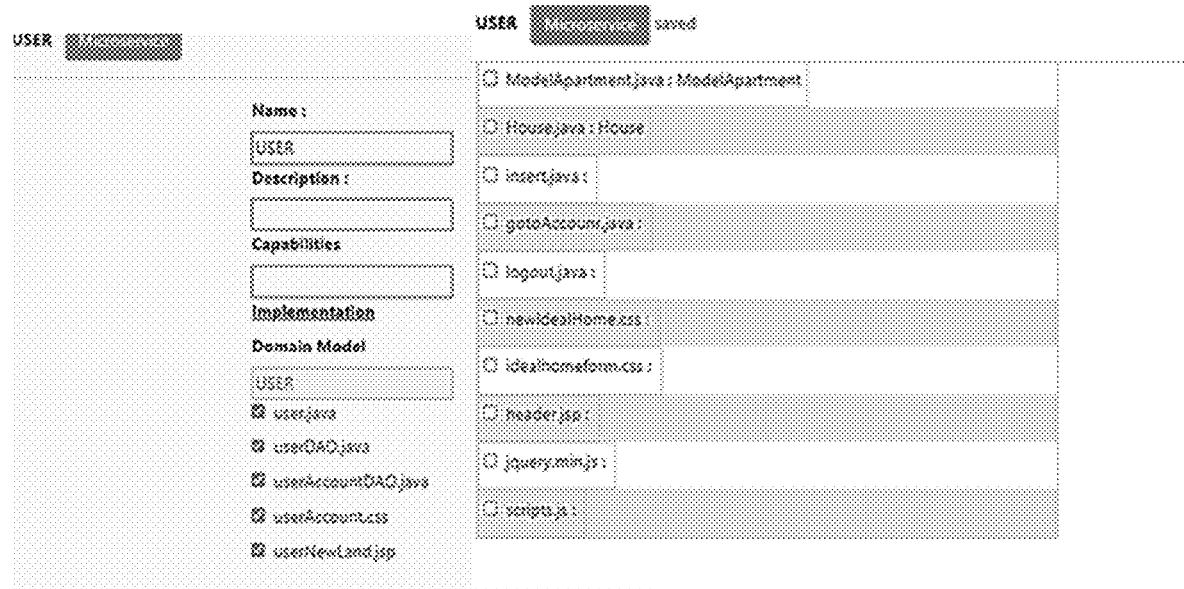
FIGS. 34 (a), 34 (b) and 34 (c) illustrates diagram showing generation of micro service template from decomposed domain, in accordance with an embodiment of the present subject matter.
Figure 34:
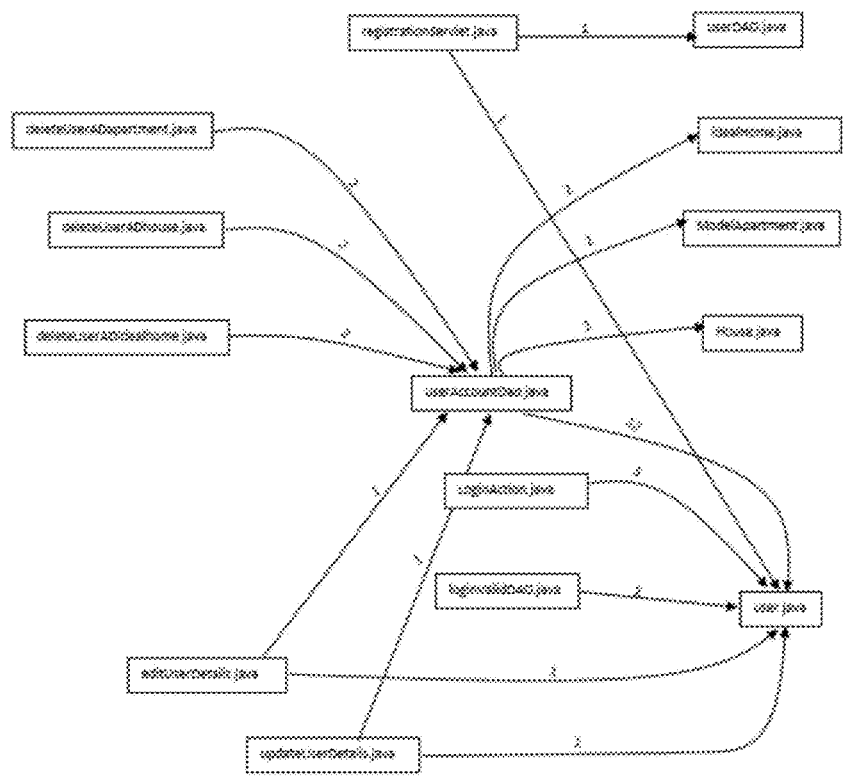

FIGS. 34 (a), 34 (b) and 34 (c) illustrates diagram showing generation of micro service template from decomposed domain. The micro service templates are generated and used for generating an updated code framework for reconfiguring forward engineering the legacy application code to the target architecture.

Exemplary embodiments discussed above may provide certain advantages. Though not required to practice aspects of the disclosure, the advantages may include those provided by the following features.

The embodiments of present disclosure herein address unresolved problem of high cost, high time and quality issues involved in the legacy application code reconfiguration. The embodiment thus provides a method 300 and system 102 for reconfiguring the legacy application code using a model driven approach.

Some embodiment of the system 102 and the method 300 uses UI Frameworks like Angular and associated charting and visualization frameworks like Hicharts.

Some embodiments of the system 102 and the method 300 may utilize back-end Python libraries & frameworks like flask and Mongo DB.

Some embodiment of the system 102 and the method 300 may use common data structure libraries in python including array, tables, lists, Trees.

Some embodiment of the system 102 and the method 300 may use common AI Natural Language Processing (NLP) libraries (like WordToVec) and common AI clustering and community detection Python libraries.

Various other modifications, adaptations, and alternative designs are of course possible in light of the above teachings. Therefore, it should be understood at this time that, within the scope of the appended claims, the invention can be practiced otherwise than as specifically described herein.

The invention claimed is:

1. A method for reconfiguring a legacy application code, the method comprising:
   receiving, through a user interface, legacy application code as an input;
   parsing, through a processor, legacy application code, wherein the processor is coupled to a memory, and wherein the processor is configured to execute instructions stored in the memory, and wherein the processor is configured for:
      scanning, through a scanner, the legacy application code, wherein the legacy application code is written in a source language;

extracting, business logic rules from the legacy application code, wherein the business logic rules is extracted through natural language processing;

analyzing, through an analyzer, the legacy application code by using a legacy code meta model, wherein the legacy code meta model is used for extracting key features from the legacy application code and signatures of one or more legacy languages used for writing the legacy application code, wherein the key features and the signatures are used for reconfiguring the legacy application code;

simulating, based on the analyzing, content of the legacy application code by executing reverse engineering for obtaining a reverse engineered legacy code;

decomposing and componentizing, the reverse engineered legacy code for identifying legacy components, wherein the legacy components are clustered according to domain for obtaining a decomposed domain; and generating, micro service templates from the decomposed domains of the reverse engineered legacy code, wherein the micro service templates are used for generating an updated code framework for reconfiguring the legacy application code.

2. The method of claim 1, wherein the legacy code meta model is generated by using a pattern analysis algorithm and library, and wherein the legacy code meta model adds additional attributes used by the analyzer for analyzing the legacy application code, wherein the additional attributes comprise type of component in the legacy application code, language agnostic directed graph representation of relationship and weights between the type of components, called & calling app name in the legacy application code and glossary and annotations associated with the legacy application code.

3. The method of claim 1, wherein the analyzer comprises a set of expandable modules, wherein the set of expandable modules are configured by using algorithms or logic for extracting the key features and the signatures of the legacy application code, wherein the set of expandable modules comprise inventory, cyclomatic complexity, dead code, cross reference, Create, Read, Update, Delete (CRUD), Business Rule Engine (BRE) extractor, Customer Information Control System (CICS) screen simulator, spider analysis or program flow.

4. The method of claim 1, wherein the processor is configured for decomposing and componentizing by:

applying, algorithms on the reverse engineered legacy code for identifying the legacy components, wherein the legacy components comprise classes or files associated with the legacy application code, technology layer components in the legacy application code, affinity based domain components in the legacy application code, batch Main Frame (MF) components in the legacy application code, online MF components in the legacy application code, and wherein the legacy components are decomposed based on technology layers, batch or online; and optimizing, the legacy components for finding an optimal level of decomposition granularity for decomposing the legacy application code based on predefined criteria, wherein the predefined criteria comprise a of max percentage domain Cohesive Index (CI) to total CI, a max % of dependency indicating dependency between components decomposed in the legacy application code for conversion of the components to the micro services, an Standard Deviation (SD) of domain CI excluding zero domains, SD of connectivity excluding zero values or % of zero domains.

5. The method of claim 1, wherein the content of the legacy application code comprises components of the legacy application code, total number of lines in the legacy application code, number of tables in the legacy application code, orphan or drive components, missing components, and lines of dead code in the legacy application code.

6. The method of claim 1, wherein the business logic rules are used for representing the legacy application code in an informative manner, wherein the business logic rules illustrates legacy program name, relevant para name in the legacy application code, source statements in the legacy application code, rule description, rule category or rule relation associated with legacy application code, wherein the business logic rules translates the legacy application code in one of a chart, flow diagram, or annotated version of the legacy application code.

7. The method of claim 1, wherein the domain is decomposed by using decomposition algorithms for identifying domain affinity strength parameter required for decomposition of the domain, wherein the decomposed domain comprises domain name, file name, cohesive index or file class.

8. A system for reconfiguring a legacy application code, the system comprising:

a user interface;

a memory; and a processor coupled to the memory, wherein the processor is configured to execute instructions stored in the memory, wherein the processor is configured for:

scanning, through a scanner, the legacy application code, wherein the legacy application code is written in a source language;

extracting, a business logic rules from the legacy application code, wherein the business logic rules are extracted through natural language processing;

analyzing, through an analyzer, the legacy application code by using a legacy code meta model, wherein the legacy code meta model is used for extracting key features from the legacy application code and signatures of one or more legacy languages used for writing the legacy application code, wherein the key features and the signatures are used for reconfiguring the legacy application code;

simulating, based on the analyzing, content of the legacy application code by executing reverse engineering for obtaining a reverse engineered legacy code;

decomposing and componentizing, the reverse engineered legacy code for identifying legacy components, wherein the legacy components are clustered according to domain for obtaining a decomposed domain; and generating, micro service templates from the decomposed domains of the reverse engineered legacy code, wherein the micro service templates are used for generating an updated code framework for reconfiguring the legacy application code.

* * * * *